(12) United States Patent
Smith et al.

(10) Patent No.: US 8,747,543 B2
(45) Date of Patent: Jun. 10, 2014

(54) PCC FILLER COMPOSITION FOR IMPROVED PRINTABILITY OF SUPERCALENDERED PAPERS

(75) Inventors: David Lee Smith, Catasauqua, PA (US); Gerald D. Erdman, Reading, PA (US); Harry J. Huhn, III, Catasauqua, PA (US); Marko Pohjolainen, Kaarina (FI); Joseph A. Sohara, Northampton, PA (US)

(73) Assignee: Specialty Minerals (Michigan) Inc., Bingham Farms, MI (US)

(*) Notice: Subject to any disclaimer, the term of this patent is extended or adjusted under 35 U.S.C. 154(b) by 0 days.

(21) Appl. No.: 14/003,260

(22) PCT Filed: Apr. 5, 2012

(86) PCT No.: PCT/US2012/032365
§ 371 (c)(1),
(2), (4) Date: Sep. 13, 2013

(87) PCT Pub. No.: WO2012/138890
PCT Pub. Date: Oct. 11, 2012

(65) Prior Publication Data
US 2014/0000485 A1    Jan. 2, 2014

Related U.S. Application Data

(60) Provisional application No. 61/472,455, filed on Apr. 6, 2011, provisional application No. 61/472,512, filed on Apr. 6, 2011.

(51) Int. Cl.
*C09C 1/02*    (2006.01)

(52) U.S. Cl.
USPC .......................................... 106/464; 423/423

(58) Field of Classification Search
USPC ........................ 106/464; 162/181.2; 423/430
See application file for complete search history.

(56) References Cited

U.S. PATENT DOCUMENTS

| | | |
|---|---|---|
| 7,128,887 B2 | 10/2006 | Huhn, III |
| 7,267,719 B2 | 9/2007 | Lunden et al. |
| 7,468,101 B2 | 12/2008 | Hansen et al. |
| 7,758,690 B2 | 7/2010 | Nutbeem et al. |

*Primary Examiner* — Pegah Parvini
(74) *Attorney, Agent, or Firm* — Leon Nigohosian, Jr.

(57) ABSTRACT

A method of blending a fine precipitated calcium carbonate (PCC) filler with larger PCC, the resulting blend to be used alone or in conjunction with a ground carbonate, clay or other filler, resulting in improved porosity by the lowering of the porosity of supercalendered paper, thereby imparting improved and offset printability. The fine PCC can be ultrafine PCC filler which then is blended with other fillers including but not limited to pigments. These fillers which are blended with the fine PCC include commercial and experimental PCC and commercial clays. Ultrafine PCC has agglomerates of small, discrete particles. Ultrafine PCC for use in the invention has a specific surface area of about 20 m2/g as measured by BET gas adsorption. As measured by a sedigraph, the average size of these agglomerates is from 0.4 to 1.1 microns.

11 Claims, 17 Drawing Sheets

PCC FILLER COMPOSITION FOR IMPROVED PRINTABILITY OF SUPERCALENDERED PAPERS

This application claims the benefit of prior filed U.S. provisional application 61/472,455 filed Apr. 6, 2011 entitled "PCC Filler Composition for Improved Printability of Supercalendered Papers" the entire specification of which is incorporated by reference. This application also claims the benefit of prior filed U.S. provisional application 61/472,512 filed Apr. 6, 2011 entitled "FCC Filler Composition for Improved Printability of Supercalendered Papers" the entire specification of which is incorporated by reference.

FIELD OF THE INVENTION

The present invention relates in general to methods for improving the printability of filled groundwood supercalendered papers.

BACKGROUND OF THE ART

Supercalendered (SC) papers generally are used in a variety of inexpensive color printed media, most often as advertising inserts to newspapers. Calendering is the process by which paper is pressed between two cylinders to impart a smooth surface. The term SC refers to pressures that are sufficiently high so as to impart not only a smooth but also glossy finish to the paper, rendering it suitable for such printing applications.

Compared to most grades of paper, supercalendered papers generally contain high percentages of mineral fillers, as much as 40 weight percent or higher. This is typically done for reasons of economics, as well as to provide a surface that is optimal for printing. Hydrous kaolin clays are comprised of clustered plate-like structures that, after exposure to the calendering tend to break apart into more discrete structures that provide a good printing substrate.

Precipitated calcium carbonate (FCC) is a synthetic pigment, well-known and used by the paper industry, that typically exhibits spheroidal-type, non-platy structures. PCC is often used in filled papers due the high whiteness and brightness it imparts. However, because of its spheroidal shape, PCC often increases the porosity of the sheet. Porous papers typically do not print as well as non-porous ones, and this has been associated with absorption by the porous papers of the liquid vehicles that are employed to transport ink to the paper surface. However, such porosity in paper aids in scattering incident light, thus contributing to desirable properties such as opacity and brightness.

The preferred printing process for SC papers is offset lithography. The basic printing unit of an offset press contains three or sometimes more cylinders: a plate cylinder, to which the plate is attached, a blanket cylinder, to which the offset blanket is attached, and an impression cylinder, which carries the paper through the printing unit and provides a hard backing against which the blanket can impress an image on the paper. Many presses also contain some number of transfer cylinders, which carry the paper either to additional printing units such as in multi-color presses or to the delivery tray.

The arrangement of the cylinders can vary depending on the press, so long as the proper cylinders are adjacent to each other. The plate cylinder is typically the topmost cylinder, and is in contact with the inking and dampening form rollers. The plate contains a right-reading image that is inked by the inking system. As the plate cylinder rotates, it is brought into contact with the blanket cylinder beneath it. The blanket cylinder can be backed away from the plate cylinder, to facilitate removal and adjustment of the plate. The inked image areas of the plate transfer the image to the rubber blanket, the image now being wrong-reading. The paper or other substrate is carried by the feeder system to the impression cylinder, and is sent through the nip between the blanket and impression cylinders. There, the blanket transfers the image to the substrate. The substrate then is transferred to the delivery cylinder if the press is a single-color press or to a series of transfer cylinders which send it to other printing units if the press is a multi-color press.

Among the most common issues that can be encountered in an offset press room printing filled SC papers are piling and picking, and PCC-filled papers tend to be more prone to these than clay-filled sheets.

Piling is a printing problem characterized by the accumulation of paper fibers called lint, bits of detached coating particles, or other debris such as pickouts on the printing plate or blanket, in either image or non-image areas, that affect print quality. Piling can result from a variety of causes in addition to basic surface debris, such as the use of tackier inks that overcome the paper's pick resistance, changes in the blanket's surface stickiness or increased blanket slippage, the chemical composition of the press's dampening system reacting with that of the paper, and various stresses imposed on a paper during feeding. Piling can be classified in a variety of ways, depending on the characteristics of the material. Piling not only affects print quality but can increase the rate of plate or blanket wear.

The term piling also refers to the accumulation on the plate or blanket of dry particles of ink. Ink piling commonly is caused by the inadequate viscosity of the ink vehicle, or an inadequate amount of vehicle, preventing the pigment from being transferred to the substrate with the vehicle and remaining behind on the plate or blanket. In some cases, an overly absorbent substrate will drain the vehicle away from the pigment while on the press, leaving the pigment to pile on the plate or blanket. In cases where the paper is to blame, the only solution is to use different paper. If the ink vehicle is inadequate, the addition of body gum may alleviate the problem, if there is no time for ink reformulation. Ink piling is also called caking.

Piling also refers to dried particles of ink that can collect on the impression roller or other rollers used in gravure printing.

Picking refers to rupturing or other deformation of a paper's surface caused during ink transfer by the force of a sticky ink either separating the layers of a paper, forming a blister-like protrusion in the paper, or removing portions of the paper's coating. Picking occurs when the force of an ink film exceeds the paper's pick resistance, or surface strength. There are two forms of picking: dry picking happens when water is not present; wet picking is the result of decreased pick resistance stemming from exposure to moisture prior to printing. Tearing is an extreme form of picking that rips off the paper surface, leaving a delaminated portion on the press sheet, and splitting is the tearing off of large areas of the paper surface, which then stick to the blanket. Small particles that are picked out of the paper surface are called pickouts. Picking is also called plucking.

Picking also describes a similar problem of gravure printing in which bits of the substrate are transferred to the impression roller or other roller.

The term picking also refers to a printing problem occurring in multi-color flexographic printing in which the plates of successive colors remove bits of the first printed color, commonly caused by printing on still-wet ink. Flexographic picking can be alleviated by ensuring that the first down color has the most rapid drying time.

DESCRIPTION OF THE INVENTION

Figure 1:
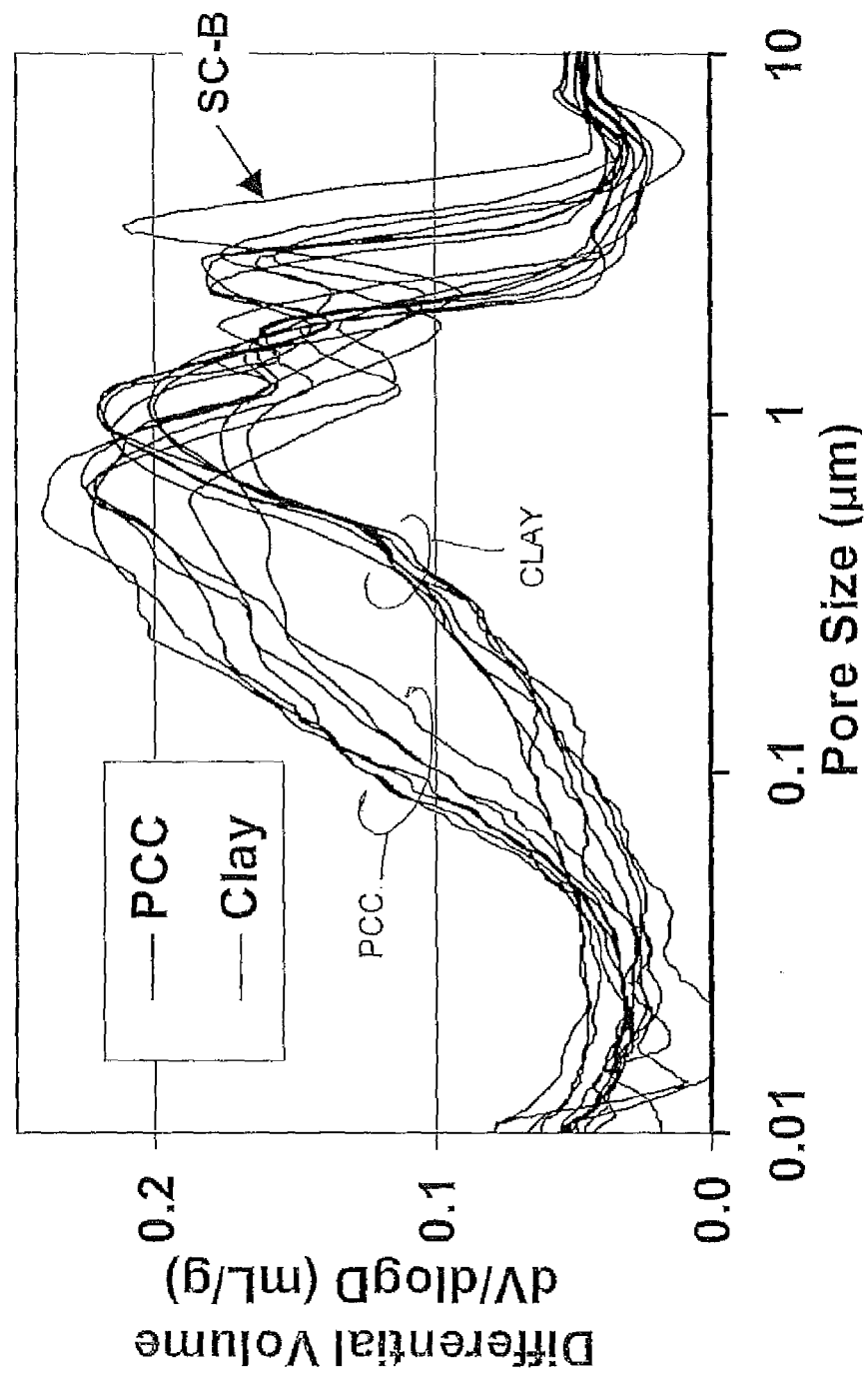
FIG. 1 is a graph showing the porosity of PCC and clay-filled SC papers.

Specialty Minerals Inc. has studied the issues of piling and picking associated with PCC-filled SC papers. In particular, there is a pronounced difference in the porous structure of sheets containing clay vs. FCC-containing papers. This is shown in FIG. 1, as measured using the method of Mercury (Hg) Porosimetry. It is obvious that the pore structure of papers containing PCC are quite different from clay-filled sheets over the same range of pore sizes.

Table 1 shows the porosities measured for eight (8) commercial papers by various methods and the relative piling results obtained.

TABLE 1

Porosity of Commercial Papers and Relative Piling Ranking

|  |  | Total Pore Volume For Pore Diameters between 0.02-5.35 μm | Density | Parker Porosity | PDA Absorption at 0.3 ms* | Piling 20k imps (4 worst) |
|---|---|---|---|---|---|---|
| Mill 1 | clay | 0.220 | 1.09 | 18 | 89 | 1 |
| Mill 2 | clay | 0.226 | 1.14 | 19 | 71 | 1 |
| Mill 3 | ⅓ PCC | 0.244 | 1.14 | 16 | 41 | 2 |
| Mill 4 | 90% PCC | 0.253 | 1.11 | 24 | 32 | 3 |
| Mill 5 | clay | 0.242 | 1.07 | 26 | 63 | 1 |
| Mill 6 | clay | 0.215 | 1.14 | 16 | 80 | 1 |
| Mill 7 | PCC | 0.284 | 1.09 | 27 | 20 | 4 |
| Mill 8 | clay | 0.235 | 1.03 | 20 | 44 | 3 |

*lower is more absorbent

Although the exact mechanism of piling remains unknown, it is thought that absorption of the ink vehicle by pores in the range of diameters preferentially imparted by PCC results in increased ink tack that leads to piling and picking. The data in the tables indicate that there exists a need for controlling the porosity of filled papers without adversely impacting the optical properties imparted by PCC.

Because the use of filler clays consistently yields good printability in groundwood SC papers, numerous efforts have been undertaken to synthesize PCC that exhibits a platy structure similar to that of clay. Now, surprisingly, it has been found that by blending a fine non-platy PCC with larger non-platy PCC, the porosity of SC groundwood papers filled with such a blend is observed to be similar to that of PCC/clay blends and printability is improved. Optical and mechanical properties of the paper, such as brightness, gloss and smoothness are similarly maintained or improved. In handsheets, use of ULTRAFINE PCC in blends has resulted in lower porosity and good optical characteristics. ULTRAFINE PCC is a product made and sold commercially by Specialty Minerals Inc. ULTRAFINE PCC consists of agglomerates of small, discrete particles. As measured by a Micromeritics Sedigraph 5100, the average size of these agglomerates is from 0.4 to 1.1 microns. ULTRAFINE PCC has a specific surface area of about 20 m²/g as measured by BET gas adsorption.

The present invention comprises a method of blending of ULTRAFINE PCC with other fillers including but not limited to pigments. These fillers include blends of commercial PCCs used alone or in conjunction with ground carbonates, commercial clays or other fillers.

A study was undertaken to determine which non-platy PCC types provide the most clay-like absorption properties in view of the above mentioned observation that spheroidal-type non-platy PCC tends to increase the porosity of supercalendered papers.

Figure 2:
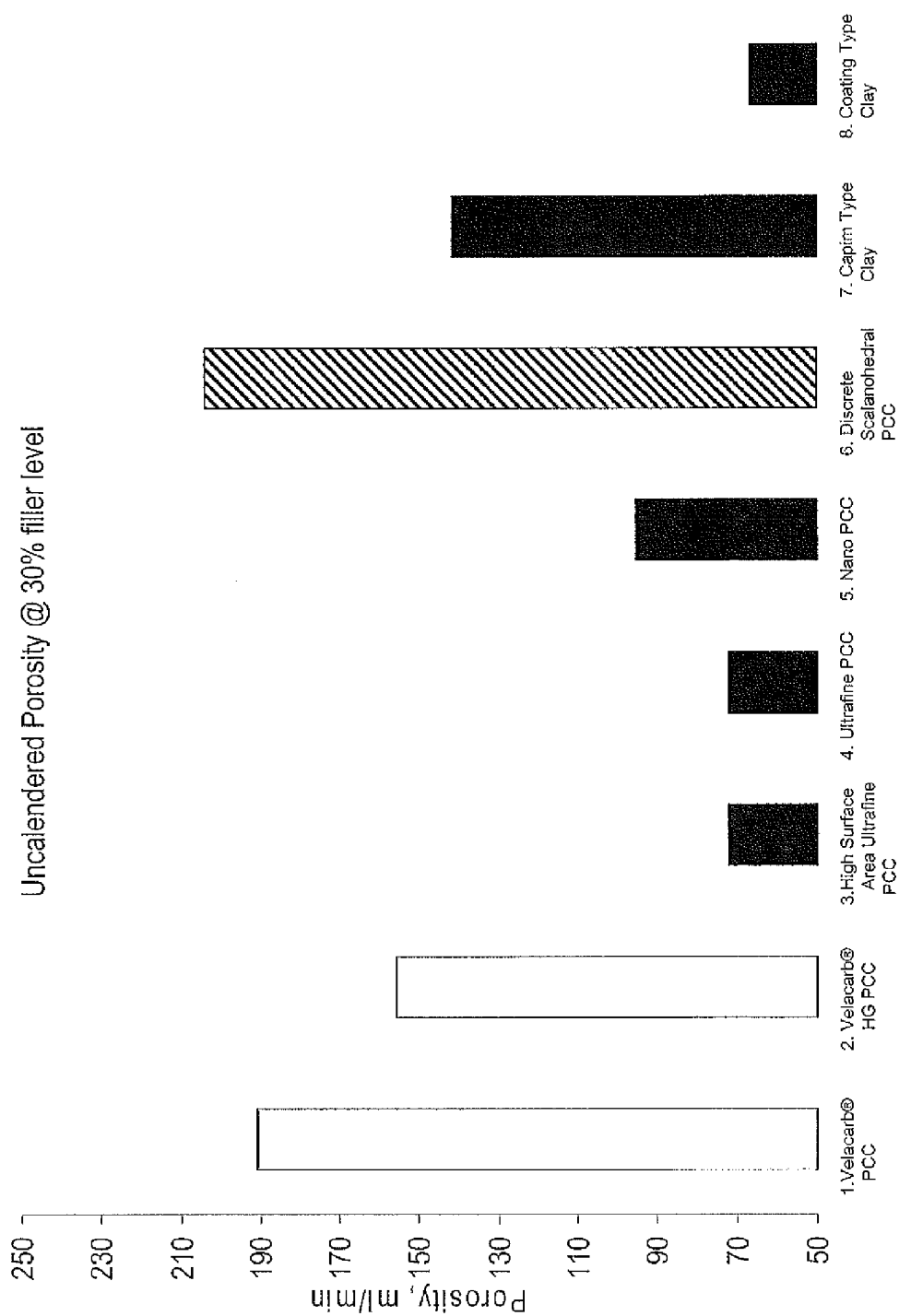
FIG. 2 is a chart showing the porosity of uncalendered paper having each of the PCC fillers and clays as specified at 30 weight percent total filler content.

Table 2 below sets forth properties of eight fillers or pigments which were tested at thirty weight percent filler content for porosity in uncalendered paper as shown in FIG. 2 and for porosity in supercalendered paper as set forth in FIG. 3.

TABLE 2

| Sample Number | Filler/Pigment Name | Specific Surface Area m²/g | $PSD_{20}$ | $PSD_{50}$ | $PSD_{90}$ |
|---|---|---|---|---|---|
| 1 | VELACARB ® PCC | 10.7 | 0.69 | 1.36 | 2.44 |
| 2 | VELACARB ® HG PCC | 12.6 | 0.61 | 1.12 | 1.89 |
| 3 | ULTRAFINE PCC High Surface Area | 41.4 | 0.16 | 0.36 | 0.93 |
| 4 | ULTRAFINE PCC | 25.6 | — | 0.06 to 0.09* | — |
| 5 | Nano PCC | — | — | — | — |
| 6 | Discrete scalenohedral PCC | 15.5 | 0.9 | 1.42 | 2.42 |
| 7 | Capim type clay | 7.2 | 0.46 | 1.60 | 5.86 |
| 8 | Coating type clay | 19.2 | 0.13 | 0.35 | 1.80 |

*As measured by SEM.

Figure 4:
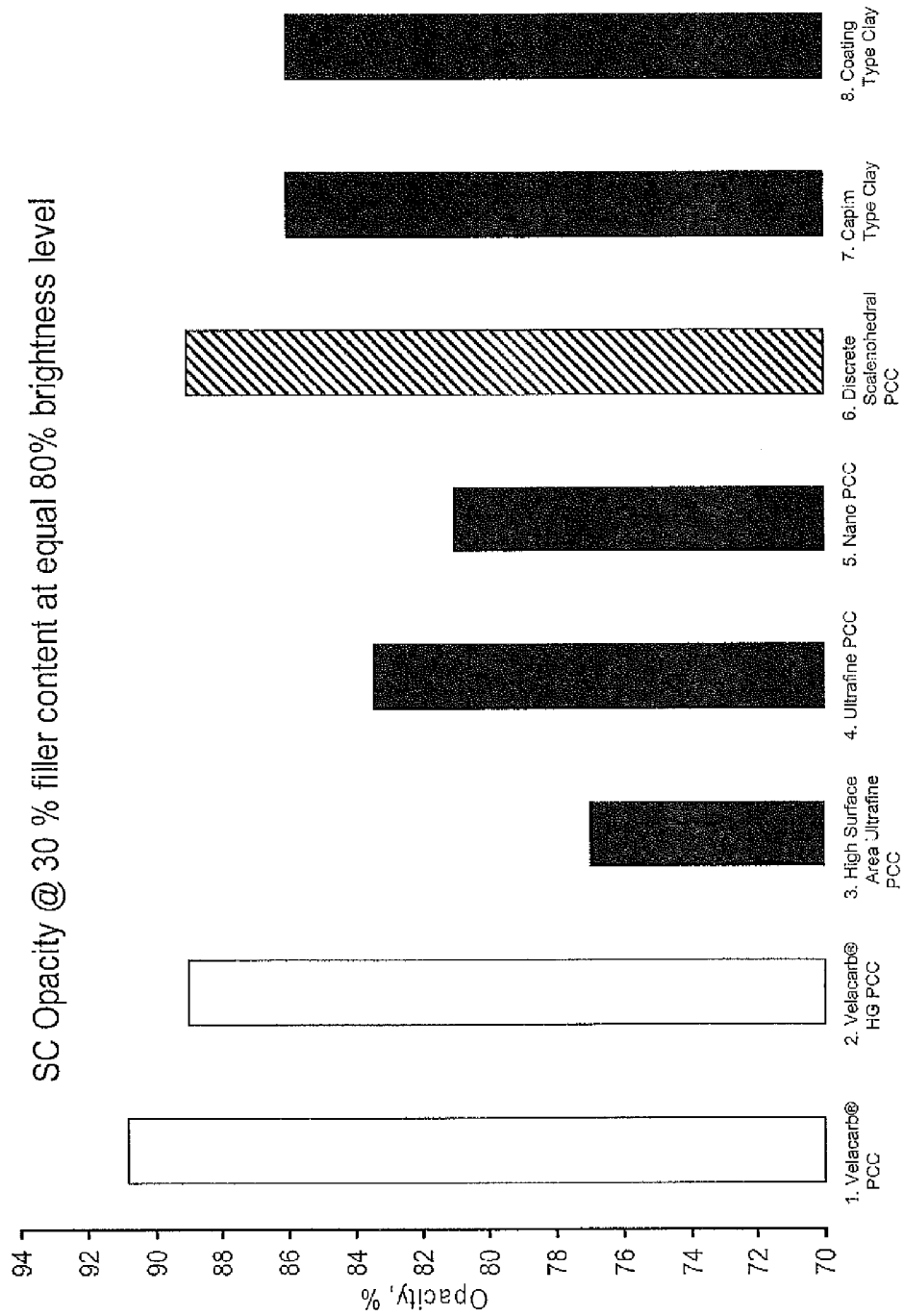
FIG. 4 is a chart showing the opacity at an equal 80 percent brightness level of supercalendered paper having each of the PCC fillers and clays as specified at 30 weight percent total filler content.

As seen in FIG. 4, the opacity of supercalendered papers having a total filler content of thirty weight percent of each of the above listed fillers was tested.

Figure 5:
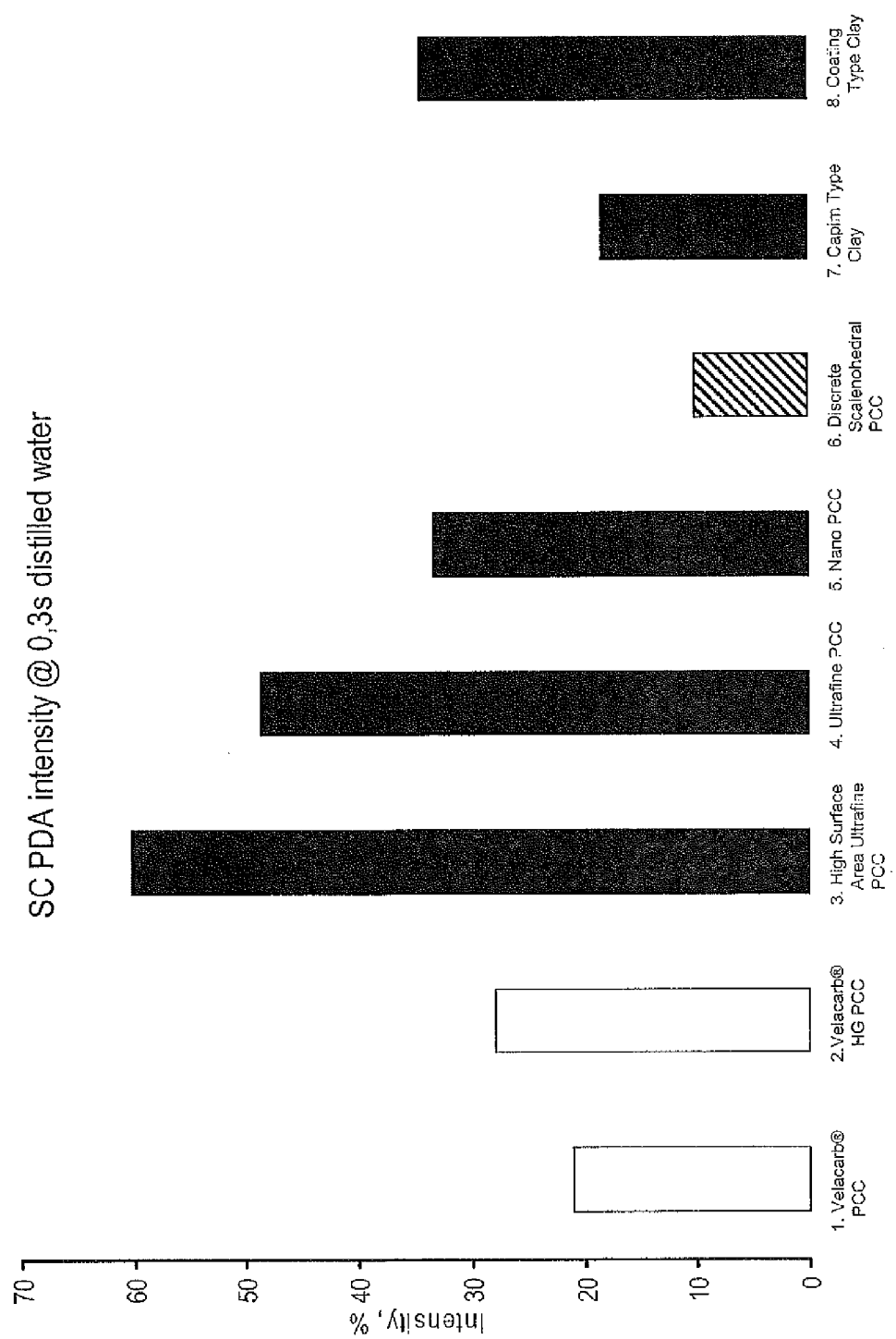
FIG. 5 is a chart showing the porosity of supercalendered paper having each of the PCC fillers and clays as specified at 30 weight percent total filler content using a penetration dynamic analyzer (PDA) at 0.3 seconds using distilled water wherein a high intensity represents a lower liquid absorption speed into paper.
Figure 6:
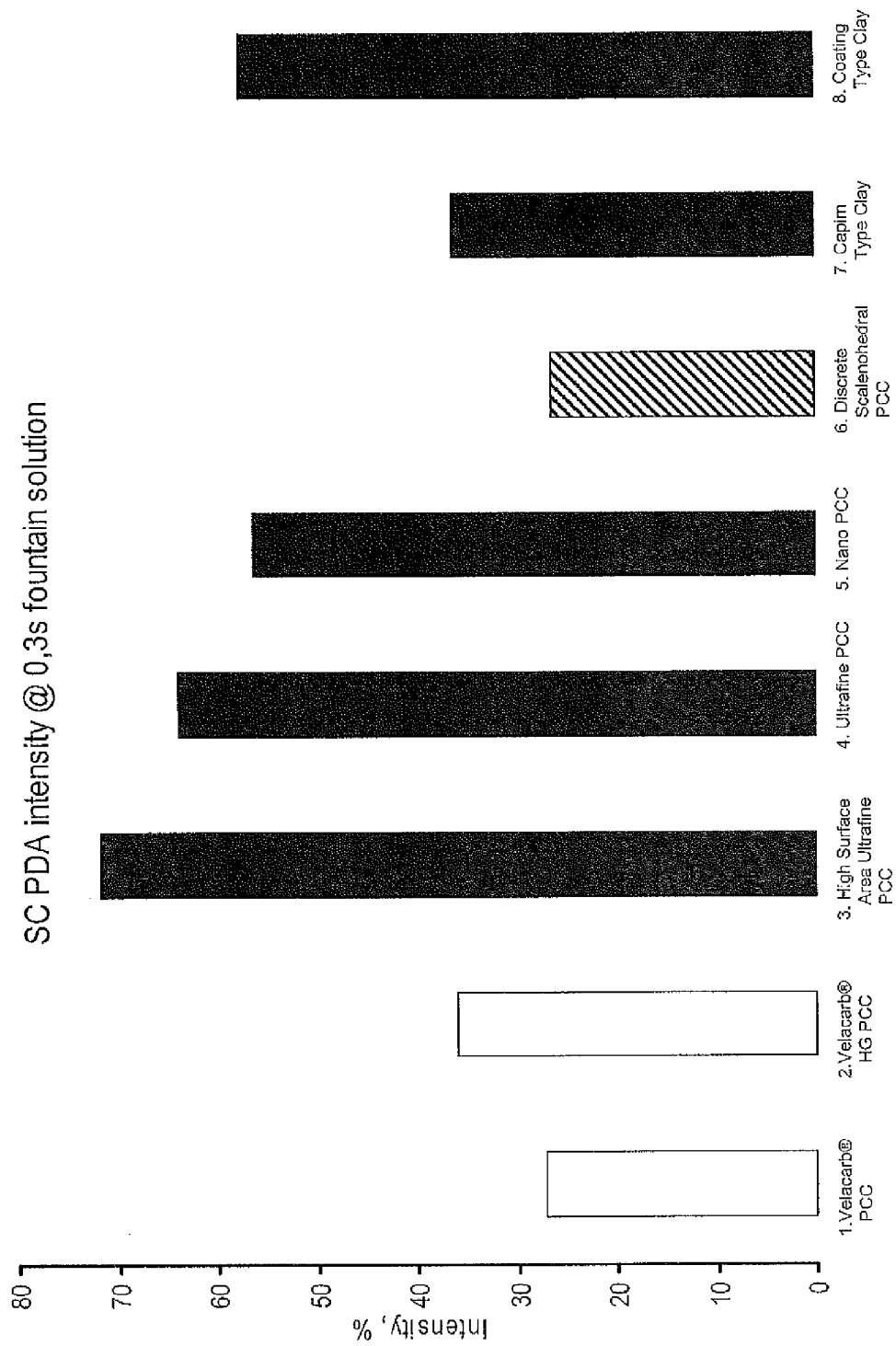
FIG. 6 is a chart showing the porosity of supercalendered paper having each of the PCC fillers and clays as specified at 30 weight percent total filler content using a penetration dynamic analyzer at 0.3 seconds using fountain solution wherein a high intensity represents a lower liquid absorption speed into paper.

Further, another measurement of porosity, an Emtec Penetration Dynamics Analyzer PDA C02 measured No. intensity at 0.3 seconds using distilled water, as shown in FIG. 5 along with the PDA intensity at 0.3 seconds using fountain solution as seen in FIG. 6.

In summary, it should be noted that both ULTRAFINE PCC samples, i.e. samples 3 and 4 in supercalendered paper resulted in a significant reduction in porosity of supercalendered paper having those two fillers as measured by air permeability testing and liquid absorption testing. However, the drop in opacity of supercalendered paper filled with either of the ULTRAFINE PCC pigments as the sole filler was a concern. Also it was noted that nano PCC worked well in reducing liquid absorption speed but retention, even in a handsheet former was very low.

As seen in Table 3A and 3B, trials employing filler blends were run using the filler pigments set forth in the Tables. The grammage of the trial papers was about 57 grams per square meter of paper, wherein 80 percent of the pulp was pressurized ground wood of Myllykoski and 20 percent soft wood of Sunila. A retention aid in the equivalent amount of 0.3 kilograms per ton of was provided during the manufacture of the paper. The two components of the filler blend were provided in the nominal proportion set forth as the percentages stated in Table 3A and Table 3B. The filler blends were provided in the paper at the weight percent filler content given for each sample. For example, for Sample 1, the filler blend was provided in the paper at a nominal or desired weight percent of 30. For filler blend sample 1a, the filler blend was provided at a nominal weight percent of 26 weight percent of the paper.

As seen in Table IV-I the actual weight percent which the filler blend sample 1a of a filler blend of VELACARB® PCC and ULTRAFINE PCC was provided in the paper was 26.9 weight percent of the paper.

TABLE 3A

| FILLER BLEND | Component Proportion | FILLER BLEND SAMPLE NUMBER | | |
|---|---|---|---|---|
| COMPONENTS: | [%] | 1/1a/1b | 2/2a/2b | 3/3a/3b |
| 1. VELACARB ® and ULTRAFINE PCC | 60/40 | 30/26/34 | | |
| 2. VELACARB ® and High Surface Area ULTRAFINE PCC | 60/40 | | 30/26/34 | |
| 3. VELACARB ® PCC and coating type Clay | 60/40 | | | 30/26/34 |

TABLE 3B

| FILLER BLEND | Component Proportion | FILLER BLEND SAMPLE NUMBER | | | |
|---|---|---|---|---|---|
| COMPONENTS: | [%] | 4/4a/4b | 5/5a/5b | 6/6a/6b | 7/7a/7b |
| 4. VELACARB ® PCC and Capim type Clay | 60/40 | 30/26/34 | | | |
| 5. VELACARB ® PCC and Platy PCC | 60/40 | | 30/26/34 | | |
| 6. VELACARB ® PCC and high AR aragonite | 60/40 | | | 30/26/34 | |
| 7. High Aspect Ratio discrete aragonite PCC | 100 | | | | 30/26/34 |

Although the target or desired weight percent of the filler blend for Sample 1a was 26 weight percent, the actual weight percent which filler blend sample 1a was provided in the paper was 26.9 weight percent of the paper as seen in Table 4-I.

TABLE 4-I

Uncalendered VELACARB ® PCC and ULTRAFINE PCC - 60/40

| Property | Filler Blend Sample 1 | Filler Blend Sample 1a | Filler Blend Sample 1b |
|---|---|---|---|
| Grammage, g/m² | 57.6 | 57.60 | 57.70 |
| CaCO₃, % | 30.0 | 26.9 | 33.5 |
| Clay % | 0.0 | 0.0 | 0.0 |
| Total % | 30.0 | 26.9 | 33.5 |
| Thickness, µm | 109.1 | 113.3 | 104.3 |
| Density, kg/m3 | 529.4 | 508.38 | 553.21 |
| R457 C | 80.2 | 79.80 | 80.58 |
| R457 D65 | 80.2 | 79.83 | 80.60 |
| Opacity C C/2 | 94.1 | 94.16 | 94.03 |
| Corr. Opacity | 94.0 | 94.04 | 93.89 |
| s C C/2 | 100.0 | 99.41 | 100.66 |
| k C C/2 | 0.9 | 0.95 | 0.88 |
| Y C C/2 | 87.3 | 87.10 | 87.59 |
| L* C C/2 | 94.9 | 94.78 | 94.99 |
| a* C C/2 | −1.0 | −1.05 | −0.98 |
| b* C C/2 | 5.8 | 5.90 | 5.63 |
| Air permeability, ml/min | 130.0 | 149.3 | 108.1 |

TABLE 4-II

Uncalendered - VELACARB ® PCC and High surface area ULTRAFINE PCC - 60/40

| Property | Filler Blend Sample 2 | Filler Blend Sample 2a | Filler Blend Sample 2b |
|---|---|---|---|
| Grammage, g/m² | 57.3 | 57.20 | 57.40 |
| CaCO₃, % | 30.0 | 27.0 | 34.7 |
| Clay-% | 0.0 | 0.0 | 0.0 |
| Total % | 30.0 | 27.0 | 34.7 |
| Thickness, µm | 112.7 | 116.8 | 106.3 |
| Density, kg/m3 | 509.4 | 489.73 | 539.98 |
| R457 C | 80.7 | 79.89 | 81.96 |
| R457 D65 | 80.7 | 79.92 | 81.99 |
| Opacity C C/2 | 93.3 | 93.24 | 93.39 |
| Corr. Opacity | 93.2 | 93.19 | 93.32 |
| s C C/2 | 100.2 | 97.87 | 103.78 |
| k C C/2 | 0.7 | 0.75 | 0.67 |
| Y C C/2 | 88.7 | 88.33 | 89.27 |
| L* C C/2 | 95.5 | 95.30 | 95.69 |
| a* C C/2 | −1.3 | −1.41 | −1.20 |
| b* C C/2 | 6.4 | 6.77 | 5.81 |
| Air permeability, ml/min | 140.4 | 147.9 | 128.7 |

TABLE 4-III

Uncalendered - VELACARB ® PCC and coating type clay, 60/40

| Property | Filler Blend Sample 3 | Filler Blend Sample 3a | Filler Blend Sample 3b |
|---|---|---|---|
| Grammage, g/m² | 57.4 | 57.30 | 57.60 |
| CaCO₃, % | 20.4 | 19.0 | 23.9 |
| Clay-% | 9.6 | 8.6 | 11.9 |
| Total % | 30.0 | 27.6 | 35.8 |
| Thickness, µm | 111.9 | 113.8 | 107.3 |
| Density, kg/m3 | 513.2 | 503.51 | 536.81 |
| R457 C | 80.7 | 80.27 | 81.78 |
| R457 D65 | 80.7 | 80.31 | 81.81 |
| Opacity C C/2 | 93.9 | 93.63 | 94.44 |
| Corr. Opacity | 93.8 | 93.57 | 94.34 |
| s C C/2 | 105.1 | 101.77 | 113.05 |
| k C C/2 | 0.8 | 0.77 | 0.75 |
| Y C C/2 | 88.6 | 88.45 | 89.10 |
| L* C C/2 | 95.4 | 95.35 | 95.62 |
| a* C C/2 | −1.2 | −1.24 | −1.02 |
| b* C C/2 | 6.3 | 6.53 | 5.78 |
| Air permeability, ml/min | 132.2 | 136.5 | 121.7 |

TABLE 4-IV

Uncalendered - VELACARB ® PCC and capim type clay, 60/40

| Property | Filler Blend Sample 4 | Filler Blend Sample 4a | Filler Blend Sample 4b |
|---|---|---|---|
| Grammage, g/m² | 57.4 | 57.40 | 57.50 |
| CaCO₃, % | 18.5 | 16.9 | 20.4 |
| Clay-% | 11.5 | 9.8 | 13.6 |
| Total % | 30.0 | 26.6 | 34.0 |
| Thickness, µm | 113.5 | 116.2 | 110.2 |
| Density, kg/m3 | 506.7 | 493.98 | 521.78 |
| R457 C | 80.9 | 80.17 | 81.75 |
| R457 D65 | 80.9 | 80.19 | 81.76 |
| Opacity C C/2 | 93.9 | 93.55 | 94.42 |
| Corr. Opacity | 93.9 | 93.47 | 94.33 |
| s C C/2 | 105.7 | 100.60 | 111.71 |
| k C C/2 | 0.8 | 0.77 | 0.78 |
| Y C C/2 | 88.6 | 88.36 | 88.89 |
| L* C C/2 | 95.4 | 95.31 | 95.53 |
| a* C C/2 | −1.2 | −1.28 | −1.08 |
| b* C C/2 | 6.2 | 6.56 | 5.68 |
| Air permeability, ml/min | 184.1 | 189.8 | 177.4 |

TABLE 4-V

Uncalendered VELACARB ® PCC and thin plate platy PCC, 60/40

| Property | Filler Blend Sample 5 | Filler Blend Sample 5a | Filler Blend Sample 5b |
|---|---|---|---|
| Grammage, g/m² | 57.0 | 57.10 | 56.90 |
| CaCO₃, % | 30.0 | 25.8 | 34.9 |
| Clay-% | 0.0 | 0.0 | 0.0 |
| Total % | 30.0 | 25.8 | 34.9 |
| Thickness, µm | 113.3 | 114.8 | 111.5 |
| Density, kg/m3 | 503.4 | 497.39 | 510.31 |
| R457 C | 79.6 | 78.84 | 80.49 |
| R457 D65 | 79.6 | 78.86 | 80.51 |
| Opacity C C/2 | 95.3 | 95.04 | 95.69 |
| Corr. Opacity | 95.3 | 95.03 | 95.70 |
| s C C/2 | 119.9 | 113.15 | 127.67 |
| k C C/2 | 0.9 | 0.96 | 0.92 |
| Y C C/2 | 88.2 | 87.79 | 88.69 |
| L* C C/2 | 95.2 | 95.07 | 95.45 |
| a* C C/2 | −1.2 | −1.25 | −1.15 |
| b* C C/2 | 6.9 | 7.17 | 6.50 |
| Air permeability, ml/min | 167.3 | 164.1 | 171.1 |

TABLE 4-VI

Uncalendered VELACARB ® PCC and high aspect ratio aragonite PCC, 60/40

| Property | Filler Blend Sample 6 | Filler Blend Sample 6a | Filler Blend Sample 6b |
|---|---|---|---|
| Grammage, g/m² | 57.4 | 57.30 | 57.50 |
| CaCO₃, % | 30.0 | 26.95 | 35.66 |
| Clay-% | 0.0 | 0.0 | 0.0 |
| Total % | 30.0 | 27.0 | 35.7 |
| Thickness, µm | 115.9 | 116.8 | 114.2 |
| Density, kg/m3 | 495.1 | 490.58 | 503.50 |
| R457 C | 82.5 | 81.89 | 83.71 |
| R457 D65 | 82.6 | 81.92 | 83.74 |
| Opacity C C/2 | 94.7 | 94.39 | 95.19 |
| Corr. Opacity | 94.6 | 94.34 | 95.11 |
| s C C/2 | 123.3 | 117.47 | 134.03 |
| k C C/2 | 0.7 | 0.68 | 0.64 |
| Y C C/2 | 90.1 | 89.81 | 90.71 |
| L* C C/2 | 96.0 | 95.92 | 96.29 |
| a* C C/2 | −1.2 | −1.32 | −1.12 |

TABLE 4-VI-continued

Uncalendered VELACARB ® PCC and
high aspect ratio aragonite PCC, 60/40

| Property | Filler Blend Sample 6 | Filler Blend Sample 6a | Filler Blend Sample 6b |
|---|---|---|---|
| b* C C/2 | 6.0 | 6.27 | 5.48 |
| Air permeability, ml/min | 213.5 | 207.9 | 223.9 |

TABLE 4-VII

Uncalendered - High aspect ratio aragonite PCC, 100%

| Property | Filler Blend Sample 7 | Filler Blend Sample 7a | Filler Blend Sample 7b |
|---|---|---|---|
| Grammage, g/m² | 57.1 | 56.70 | 57.60 |
| CaCO₃, % | 30.0 | 27.19 | 34.31 |
| Clay-% | 0.0 | 0.0 | 0.0 |
| Total % | 30.0 | 27.2 | 34.3 |
| Thickness, μm | 115.7 | 117.5 | 113 |
| Density, kg/m3 | 493.3 | 482.55 | 509.73 |
| R457 C | 83.3 | 82.63 | 84.41 |
| R457 D65 | 83.4 | 82.66 | 84.44 |
| Opacity C C/2 | 94.7 | 94.44 | 95.07 |
| Corr. Opacity | 94.7 | 94.49 | 94.98 |
| s C C/2 | 131.9 | 126.08 | 140.85 |
| k C C/2 | 0.6 | 0.59 | 0.53 |
| Y C C/2 | 91.2 | 90.78 | 91.73 |
| L* C C/2 | 96.5 | 96.32 | 96.71 |
| a* C C/2 | -1.3 | -1.38 | -1.22 |
| b* C C/2 | 6.1 | 6.40 | 5.68 |
| Air permeability, ml/min | 236.1 | 229.9 | 245.7 |

The filler blends listed in Tables 3A and 3B were used to form handsheets in a dynamic sheet former (DSF) at a nominal content of thirty weight percent of the paper. Filler Blend samples 7, 7a, and 7b of high aspect ratio aragonite PCC are technically not a blend of two or more fillers but they were included in the filler blend study set forth in Tables 4-VII and 5-VII and FIGS. 8 to 16 for comparison purposes.

Figure 7:
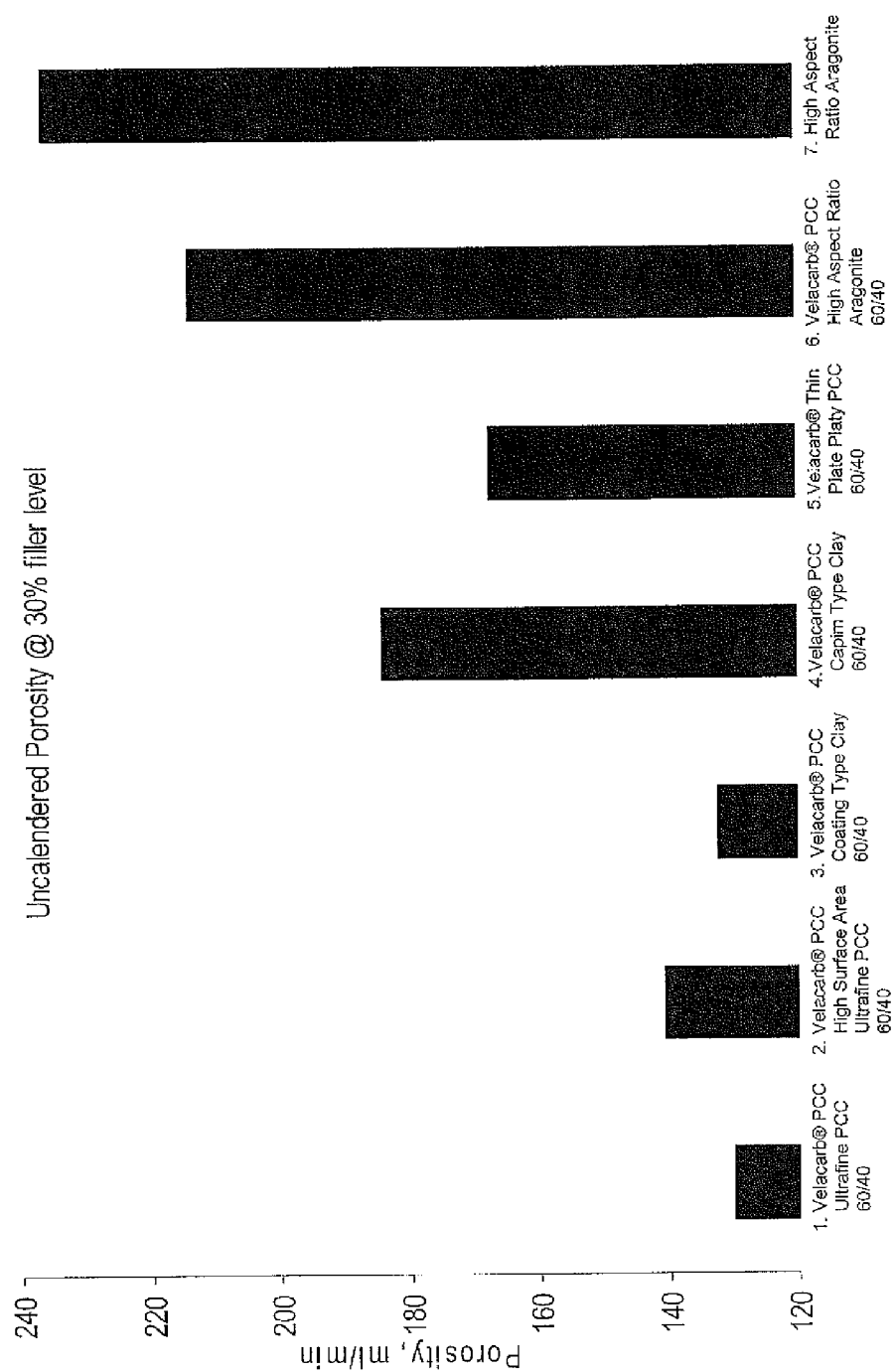
FIG. 7 is a chart showing the porosity of supercalendered paper having each of the specified blends of PCC and clay at 30 weight percent total filler content.

The uncalendered porosity of the handsheets was measured as is seen in FIG. 7.

The handsheets were then calendered as described below. The supercalender temperature was set to 100 degrees Celsius and the roll inner temperature was set to 300 degrees Celsius. The steel roll surface temperature was maintained at 90 degrees Celsius with a margin or error of plus or minus two degrees when calendaring. The pressure was increased to 70 bar and adjusted as needed to maintain 70 bar.

One DSF sheet was taken from a sealed plastic bag and the bag was resealed immediately. The sheet was calendered four times in the machine direction, with the wire side against the steel roll. Each individual sheet was calendered from the same trial point along the steel roll. Each following sheet was calendered at a different location or trial point along the steel roll.

Various properties of the supercalendered handsheets containing a total content of 30 weight percent filler blend were measured, and these data are set forth in Tables 5-I to 5-VII and set forth in the following Figures such as 1) Corrected Opacity which is opacity corrected for basis weight in FIG. 9, 2) R457-D65 brightness in FIG. 8, 3) Parker porosity measured in ml/minute in FIG. 10. Brightness can be measured as ISO brightness, R457 which is the intrinsic reflectance factor measured at an effective wavelength of 457 nm under the conditions specified in SCAN-P 3. For ISO brightness, the term diffuse blue reflectance factor is also used. D65-brightness is the intrinsic reflectance factor measured at an effective wavelength of 457 nm under the conditions specified in SCAN-P 3 when the UV-content of the illumination has been adjusted as specified in SCAN-P 66 to conform to the D65-illuminant.

Figure 14:
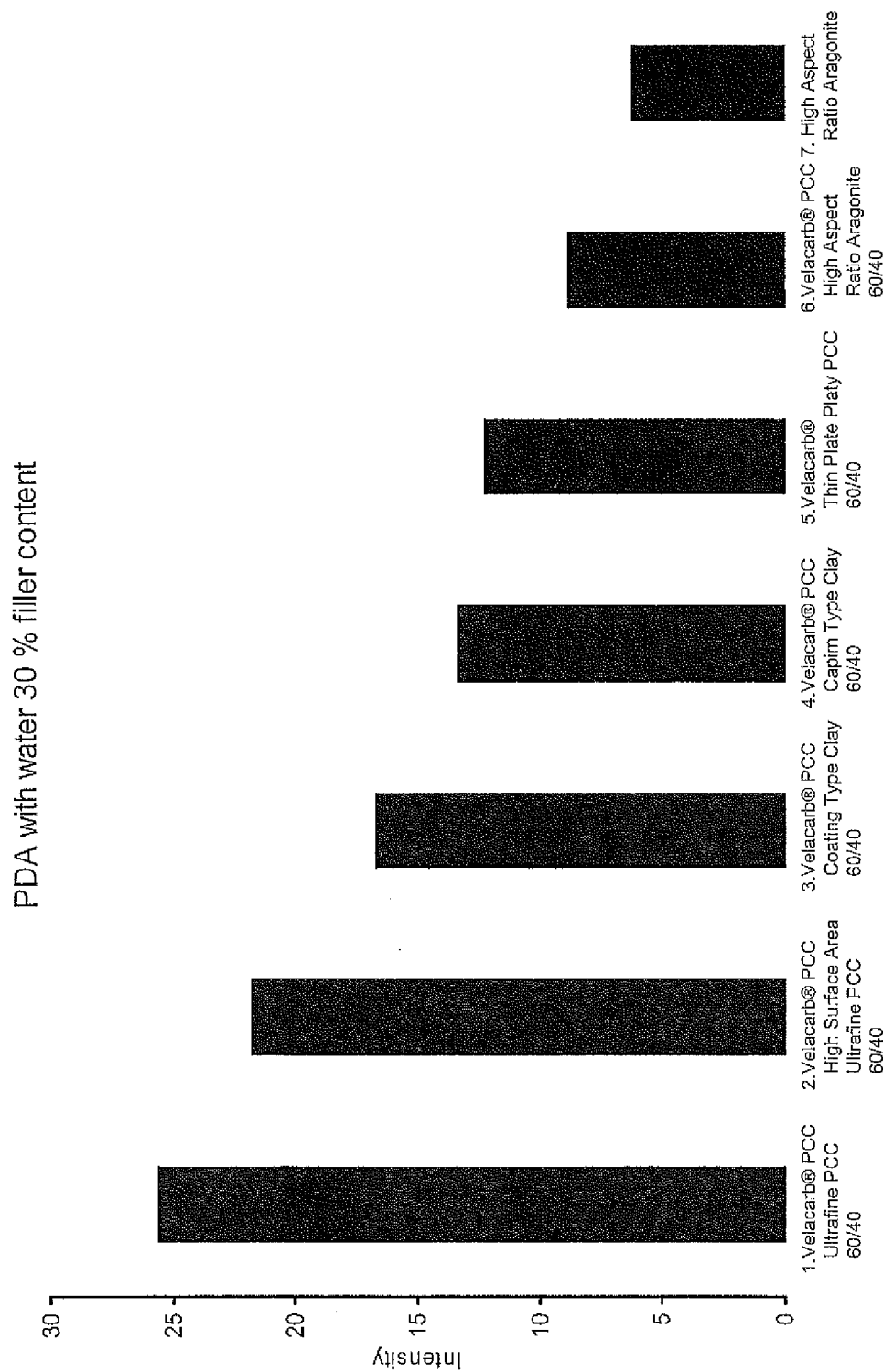
FIG. 14 is a chart showing the porosity with water of supercalendered paper having each of the blends of PCC fillers and clays as specified at 30 weight percent total filler content wherein the units are % Reflectance relative to a standard that is taken to be 100% Reflectance prior to introduction of the liquid.
Figure 15:
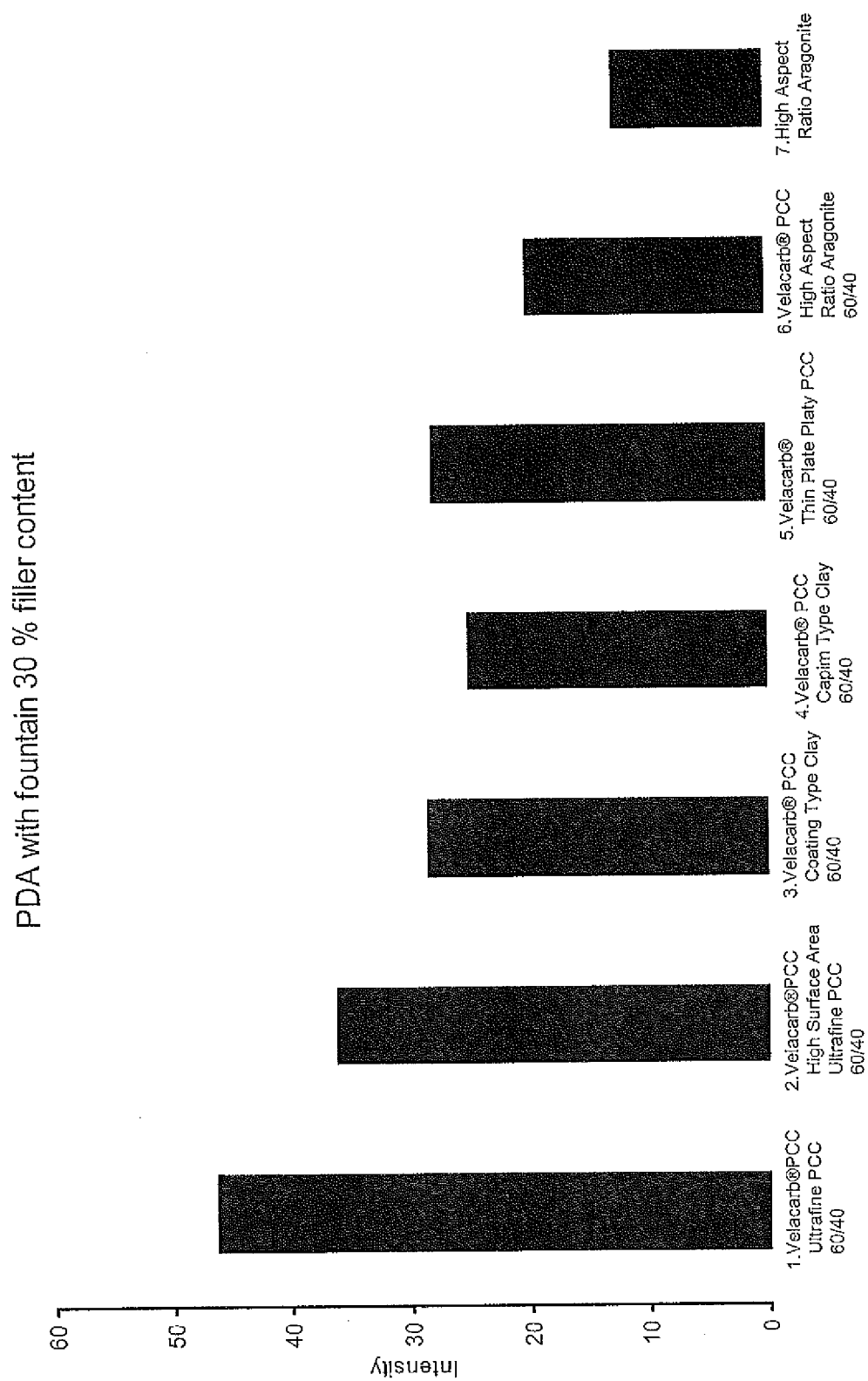
FIG. 15 is a chart showing the porosity with fountain solution of supercalendered paper having each of the blends of PCC fillers and clays as specified at 30 weight percent total filler content.
Figure 16:
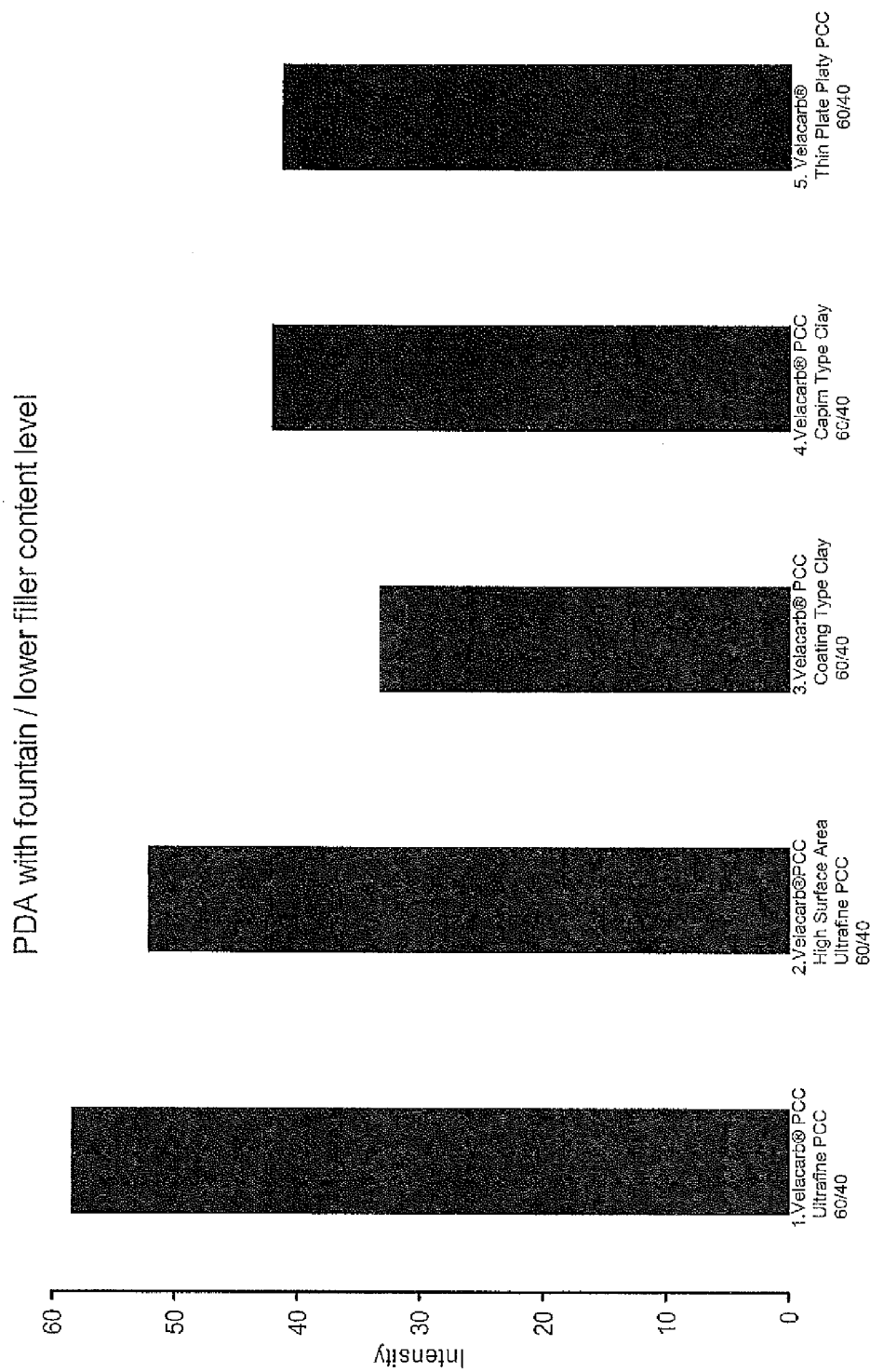
FIG. 16 is a chart showing the porosity with fountain solution of supercalendered paper having each of the blends of PCC fillers and clays as specified at 26 weight percent total filler content.
Figure 17:
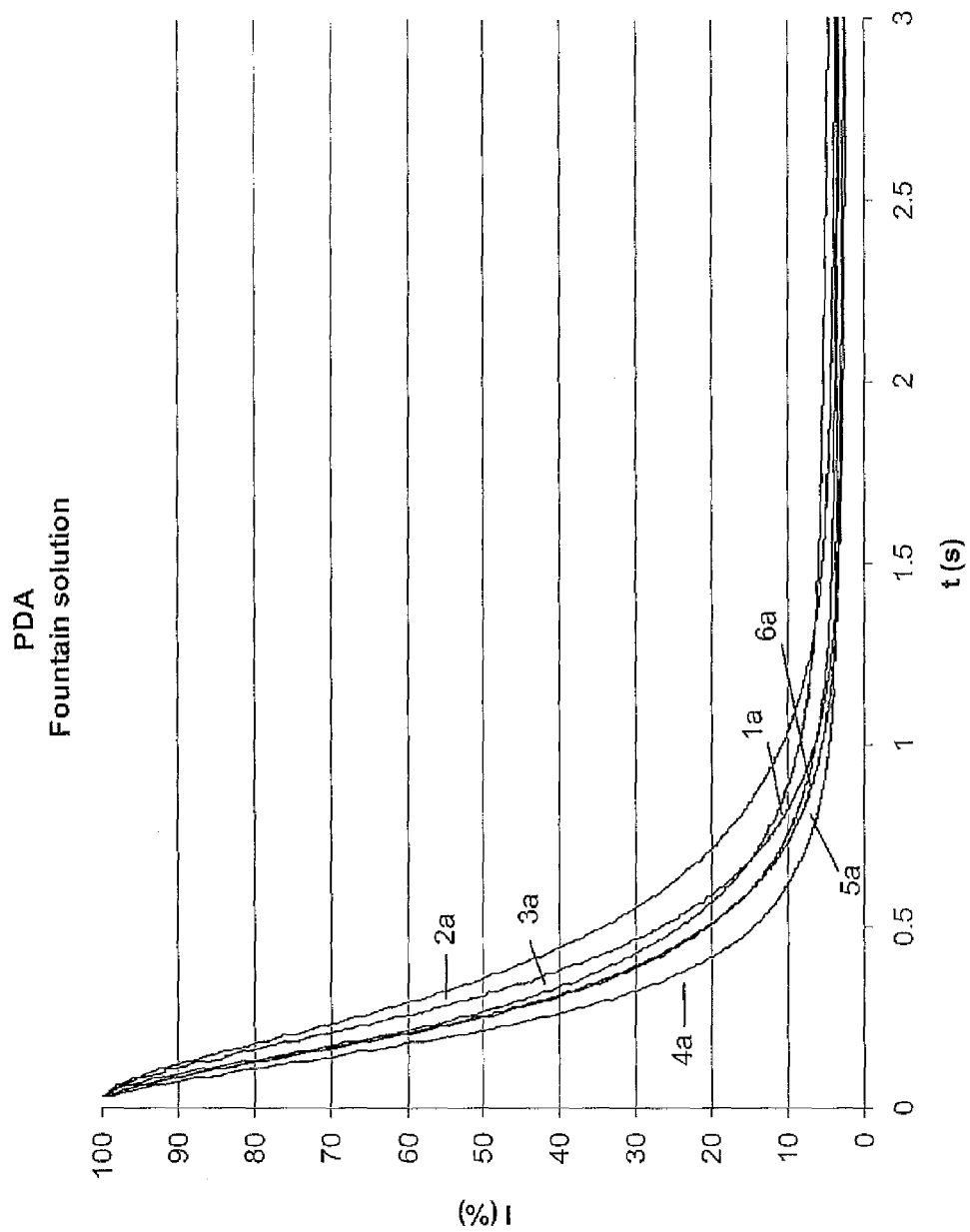
FIG. 17 is a chart showing the porosity with new fountain solution of supercalendered paper having each of the blends of PCC fillers and clays as specified at 30 weight percent total filler content.

FIGS. 14, 15 and 16 show the penetration rate as measured by a Penetration Dynamique Analyzer (FDA) manufactured by Emtec, Model C02 of water, fountain solution and fountain solution, respectively into the supercalendered handsheets. Therefore, in FIGS. 14, 15 and 16, a higher intensity indicates a lower porosity of the paper.

TABLE 5-I

Calendered - VELACARB ® PCC and ULTRAFINE PCC - 60/40

| Property | Filler Blend Sample 1 | Filler Blend Sample 1a | Filler Blend Sample 1b |
|---|---|---|---|
| Grammage, g/m² | 57.6 | 57.60 | 57.70 |
| CaCO₃, % | 30.0 | 26.9 | 33.5 |
| clay % | 0.0 | 0.0 | 0.0 |
| Total % | 30.0 | 26.9 | 33.5 |
| Thickness, μm | 58.2 | 57.8 | 58.7 |
| Density, kg/m3 | 990.2 | 997 | 983 |
| R457 C | 76.6 | 76.16 | 77.18 |
| R457 D65 | 76.7 | 76.26 | 77.29 |
| Opacity C C/2 | 90.4 | 90.33 | 90.40 |
| Corr. Opacity | 90.2 | 90.16 | 90.20 |
| s C C/2 | 68.1 | 66.49 | 69.84 |
| k C C/2 | 0.9 | 0.96 | 0.87 |
| Y C C/2 | 84.9 | 84.41 | 85.44 |
| L* C C/2 | 93.8 | 93.63 | 94.07 |
| a* C C/2 | -1.1 | -1.11 | -0.99 |
| b* C C/2 | 6.8 | 6.82 | 6.72 |
| CIE W C C/2 | 53.2 | 52.48 | 54.11 |
| Air permeability, ml/min | 20.6 | 21.60 | 19.40 |
| Gloss, ts | 31.5 | 31.43 | 31.53 |
| PPS smoothness μm, ts | 1.2 | 1.22 | 1.12 |
| Calendered air permeability/UC Air permeability | 0.16 | | |

TABLE 5-II

Calendered - VELACARB ® PCC and High surface area ULTRAFINE PCC - 60/40

| Property | Filler Blend Sample 2 | Filler Blend Sample 2a | Filler Blend Sample 2b |
|---|---|---|---|
| Grammage, g/m² | 57.3 | 57.20 | 57.40 |
| CaCO₃, % | 30.0 | 27.0 | 34.7 |
| clay % | 0.0 | 0.0 | 0.0 |
| Total % | 30.0 | 27.0 | 34.7 |
| Thickness, μm | 58.8 | 59.5 | 57.8 |
| Density, kg/m3 | 973.8 | 961 | 993 |
| R457 C | 77.4 | 76.67 | 78.61 |
| R457 D65 | 77.5 | 76.79 | 78.72 |
| Opacity C C/2 | 89.2 | 89.05 | 89.39 |
| Corr. Opacity | 89.1 | 88.98 | 89.29 |
| s C C/2 | 66.6 | 65.34 | 68.65 |
| k C C/2 | 0.7 | 0.77 | 0.71 |
| Y C C/2 | 34.1 | 0.33 | 86.60 |
| L* C C/2 | 94.4 | 94.23 | 94.57 |
| a* C C/2 | -1.4 | -1.45 | -1.26 |
| b* C C/2 | 7.1 | 7.49 | 6.49 |
| CIE W C C/2 | 53.1 | 50.87 | 56.45 |
| Air permeability, ml/min | 22.3 | 23.60 | 20.20 |
| Gloss, ts | 32.6 | 31.38 | 34.40 |
| PPS smoothness μm, ts | 1.1 | 1.13 | 1.03 |
| Calendered air permeability/UC Air permeability | 0.16 | | |

TABLE 5-III

Calendered - VELACARB ® PCC and coating type clay, 60/40

| Property | Filler Blend Sample 3 | Filler Blend Sample 3 | Filler Blend Sample 3 |
|---|---|---|---|
| Grammage, g/m$^2$ | 57.4 | 57.30 | 57.60 |
| CaCO$_3$, % | 20.4 | 19.0 | 23.9 |
| clay % | 9.6 | 8.6 | 11.9 |
| Total % | 30.0 | 27.6 | 35.8 |
| Thickness, μm | 59.1 | 59.0 | 59.3 |
| Density, kg/m3 | 971.2 | 971 | 971 |
| R457 C | 77.6 | 77.39 | 78.03 |
| R457 D65 | 77.7 | 77.50 | 78.16 |
| Opacity C C/2 | 90.6 | 90.74 | 90.15 |
| Corr. Opacity | 90.5 | 90.66 | 90.00 |
| s C C/2 | 73.1 | 74.13 | 70.66 |
| k C C/2 | 0.8 | 0.81 | 0.78 |
| Y C C/2 | 86.2 | 86.26 | 86.19 |
| L* C C/2 | 94.4 | 94.42 | 94.39 |
| a* C C/2 | −1.3 | −1.32 | −1.11 |
| b* C C/2 | 7.0 | 7.22 | 6.61 |
| CIE W C C/2 | 53.5 | 52.68 | 55.45 |
| Air permeability, ml/min | 21.6 | 23.30 | 17.50 |
| Gloss, ts | 31.4 | 29.77 | 35.32 |
| PPS smoothness μm, ts | 1.1 | 1.12 | 0.91 |
| Calendered air permeability/UC Air permeability | 0.16 | | |

TABLE 5-IV

Calendered - VELACARB ® PCC and capim type clay, 60/40

| Property | Filler Blend Sample 4 | Filler Blend Sample 4a | Filler Blend Samele 4b |
|---|---|---|---|
| Grammage, g/m$^2$ | 57.4 | 57.40 | 57.50 |
| CaCO$_3$, % | 18.5 | 16.9 | 20.4 |
| clay % | 11.5 | 9.8 | 13.6 |
| Total % | 30.0 | 26.6 | 34.0 |
| Thickness, μm | 57.6 | 58.4 | 56.7 |
| Density, kg/m3 | 997.1 | 983 | 1014 |
| R457 C | 77.7 | 77.20 | 78.40 |
| R457 D65 | 77.9 | 77.31 | 78.50 |
| Opacity C C/2 | 90.5 | 90.46 | 90.57 |
| Corr. Opacity | 90.4 | 90.35 | 90.45 |
| s C C/2 | 71.8 | 70.90 | 72.84 |
| k C C/2 | 0.8 | 0.84 | 0.81 |
| Y C C/2 | 85.9 | 85.74 | 86.12 |
| L* C C/2 | 94.3 | 94.20 | 94.36 |
| a* C C/2 | −1.2 | −1.34 | −1.12 |
| b* C C/2 | 6.7 | 7.01 | 6.29 |
| CIE W C C/2 | 54.8 | 53.10 | 56.89 |
| Air permeability, ml/min | 26.2 | 26.40 | 26.00 |
| Gloss, ts | 30.8 | 29.83 | 32.02 |
| PPS smoothness μm, ts | 1.1 | 1.08 | 1.03 |
| Calendered air permeability/UC Air permeability | 0.14 | | |

TABLE 5-V

Calendered - VELACARB ® PCC and Thin plate platy PCC, 60/40

| Property | Filler Blend Sample 5 | Filler Blend Sample 5a | Filler Blend Sample 5b |
|---|---|---|---|
| Grammage, g/m$^2$ | 57.0 | 57.10 | 56.90 |
| CaCO$_3$, % | 30.0 | 25.8 | 34.9 |
| clay % | 0.0 | 0.0 | 0.0 |
| Total % | 30.0 | 25.8 | 34.9 |
| Thickness, μm | 57.4 | 58.2 | 56.5 |
| Density, kg/m3 | 993.1 | 981 | 1007 |
| R457 C | 76.4 | 75.87 | 76.93 |
| R457 D65 | 76.5 | 75.98 | 77.01 |
| Opacity C C/2 | 92.5 | 91.65 | 93.40 |
| Corr. Opacity | 92.5 | 91.63 | 93.41 |
| s C C/2 | 82.9 | 75.75 | 91.25 |
| k C C/2 | 1.2 | 0.98 | 1.39 |
| Y C C/2 | 85.0 | 85.19 | 84.74 |
| L* C C/2 | 93.9 | 93.97 | 93.76 |
| a* C C/2 | −1.2 | −1.24 | −1.16 |
| b* C C/2 | 7.1 | 7.67 | 6.41 |
| CIE W C C/2 | 51.9 | 49.36 | 54.84 |
| Air permeability, ml/min | 23.3 | 22.60 | 24.20 |
| Gloss, ts | 35.9 | 32.93 | 39.42 |
| PPS smoothness μm, ts | 0.9 | 0.99 | 0.88 |
| Calendered air permeability/UC Air permeability | 0.14 | | |

TABLE 5-VI

Calendered - VELACARB ® PCC and High Aspect Ratio aragonite PCC, 60/40

| Property | Filler Blend Sample 6 | Filler Blend Sample 6a | Filler Blend Sample 6b |
|---|---|---|---|
| Grammage, g/m$^2$ | 57.4 | 57.30 | 57.50 |
| CaCO$_3$, % | 30.0 | 26.95 | 35.66 |
| clay % | 0.0 | 0.0 | 0.0 |
| Total % | 30.0 | 27.0 | 35.7 |
| Thickness, μm | 59.1 | 59.5 | 58.5 |
| Density, kg/m3 | 970.0 | 963 | 983 |
| R457 C | 79.9 | 79.39 | 80.89 |
| R457 D65 | 80.0 | 79.48 | 80.99 |
| Opacity C C/2 | 91.5 | 91.28 | 91.85 |
| Corr. Opacity | 91.4 | 91.21 | 91.73 |
| s C C/2 | 84.1 | 81.76 | 88.51 |
| k C C/2 | 0.7 | 0.70 | 0.66 |
| Y C C/2 | 88.0 | 87.76 | 88.56 |
| L* C C/2 | 95.2 | 95.06 | 95.39 |
| a* C C/2 | −1.3 | −1.36 | −1.13 |
| b* C C/2 | 6.5 | 6.74 | 6.10 |
| CIE W C C/2 | 57.9 | 56.59 | 60.46 |
| Air permeability, ml/min | 36.9 | 33.20 | 43.90 |
| Gloss, ts | 29.8 | 28.55 | 32.10 |
| PPS smoothness μm, ts | 1.0 | 1.05 | 0.98 |
| Calendered air permeability/UC Air permeability | 0.17 | | |

TABLE 5-VII

Calendered - High Aspect Ratio aragonite PCC

| Property | Filler Blend Sample 7 | Filler Blend Sample 7a | Filler Blend Sample 7b |
|---|---|---|---|
| Grammage, g/m$^2$ | 57.1 | 56.70 | 57.60 |
| CaCO$_3$, % | 30.0 | 27.19 | 34.31 |
| clay % | 0.0 | 0.0 | 0.0 |
| Total % | 30.0 | 27.2 | 34.3 |
| Thickness, μm | 57.3 | 57.5 | 57.0 |
| Density, kg/m3 | 995.7 | 986 | 1011 |
| R457 C | 80.8 | 79.91 | 82.15 |
| R457 D65 | 80.9 | 80.03 | 82.26 |
| Opacity C C/2 | 91.9 | 91.55 | 92.37 |

TABLE 5-VII-continued

Calendered - High Aspect Ratio aragonite PCC

| Property | Filler Blend Sample 7 | Filler Blend Sample 7a | Filler Blend Sample 7b |
|---|---|---|---|
| Corr. Opacity | 91.9 | 91.62 | 92.25 |
| s C C/2 | 92.0 | 88.12 | 98.04 |
| k C C/2 | 0.6 | 0.63 | 0.55 |
| Y C C/2 | 89.2 | 88.73 | 89.93 |
| L* C C/2 | 95.7 | 95.47 | 95.97 |
| a* C C/2 | −1.4 | −1.44 | −1.24 |
| b* C C/2 | 6.7 | 7.06 | 6.14 |
| CIE W C C/2 | 58.4 | 56.21 | 61.80 |
| Air permeability, ml/min | 38.7 | 36.60 | 41.90 |
| Gloss, ts | 32.3 | 31.90 | 32.98 |
| PPS smoothness μm, ts | 1.0 | 1.04 | 0.99 |
| Calendered air permeability/UC Air permeability | 0.16 | | |

Tables 4-I to 4-VII and Tables 5-I to 5-VII show blends of pigments that were used to form handsheets on a laboratory dynamic sheet former (DSF), and the results that were measured for those handsheets.

Figure 8:
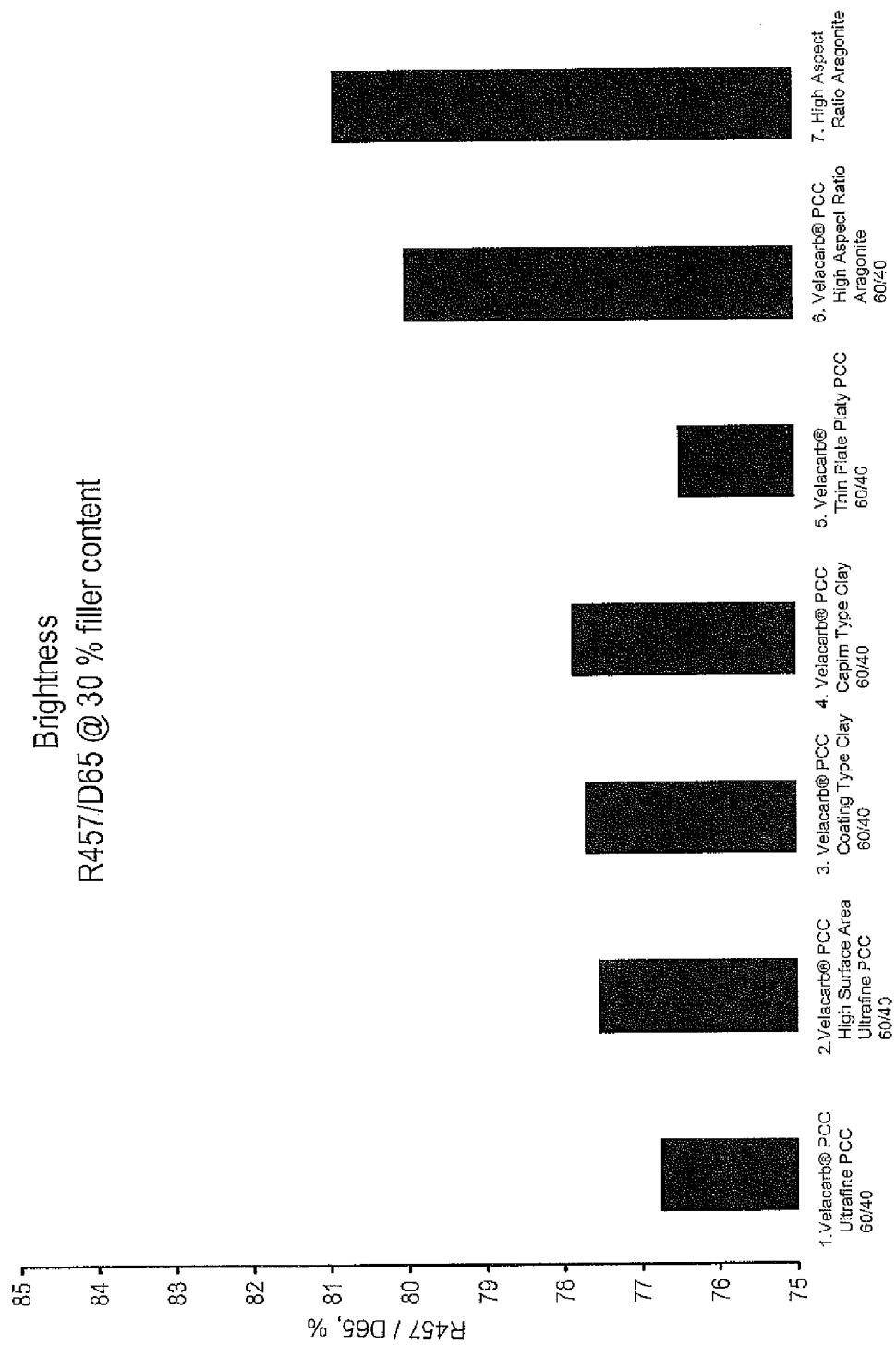
FIG. 8 is a chart showing the brightness at a specific wavelength of supercalendered paper having each of the specified blends of PCC and clay at 30 weight percent total filler content.
Figure 9:
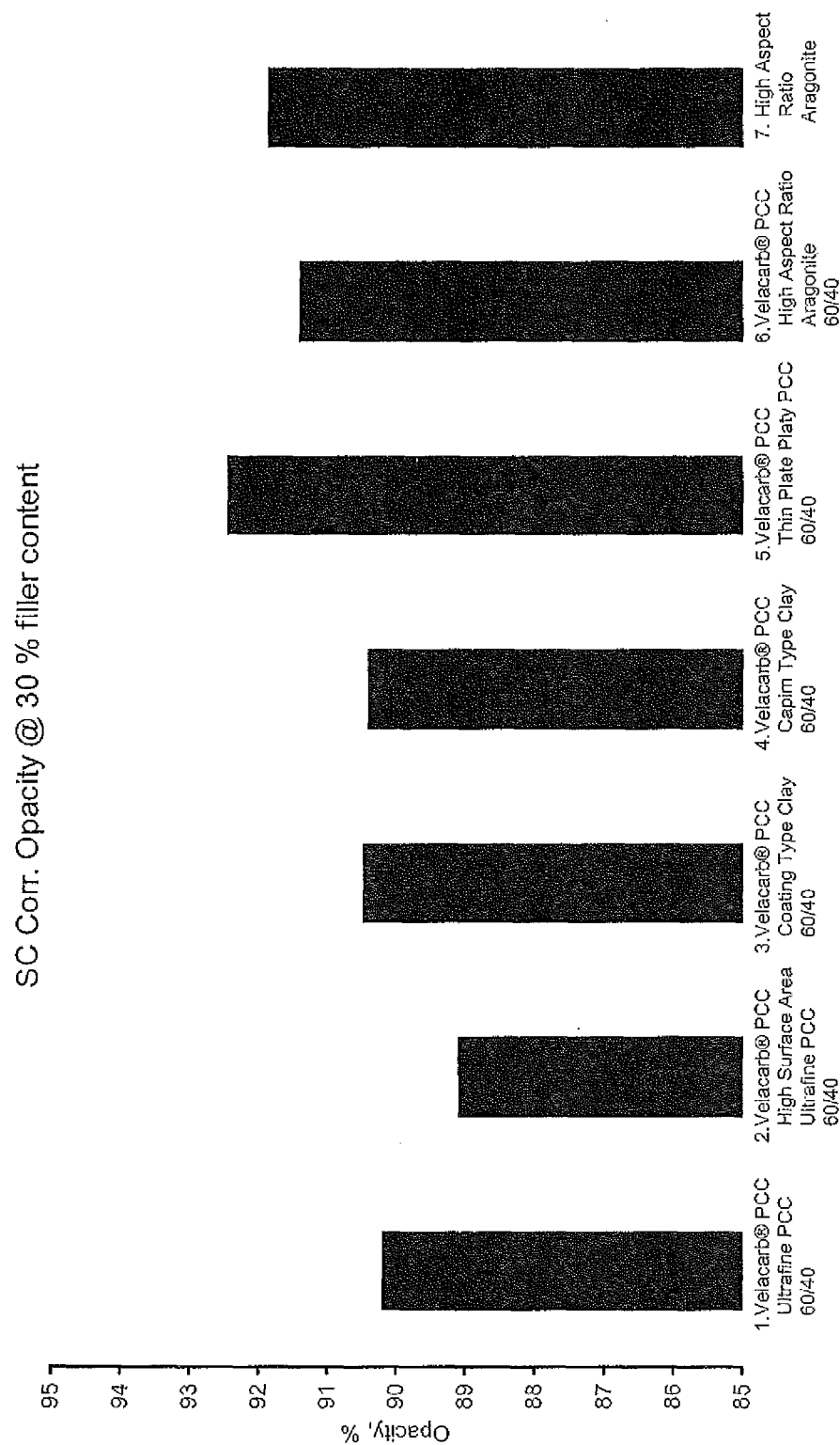
FIG. 9 is a chart showing the opacity of supercalendered paper having each of the specified blends of PCC and clay at 30 weight percent total filler content.
Figure 10:
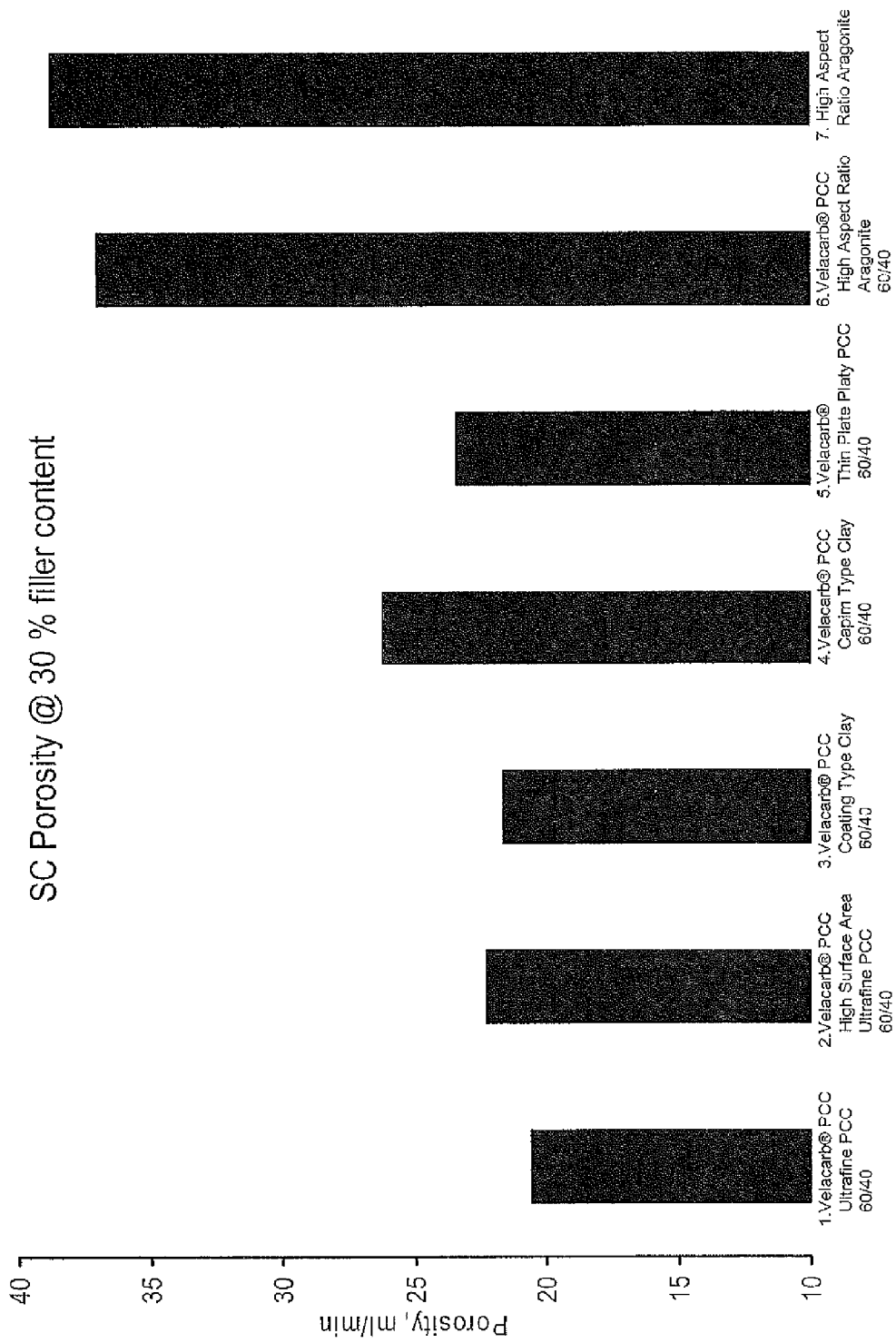
FIG. 10 is a chart showing the porosity of supercalendered paper having each of the blends of PCC fillers and clays as specified at 30 weight percent total filler content.
Figure 11:
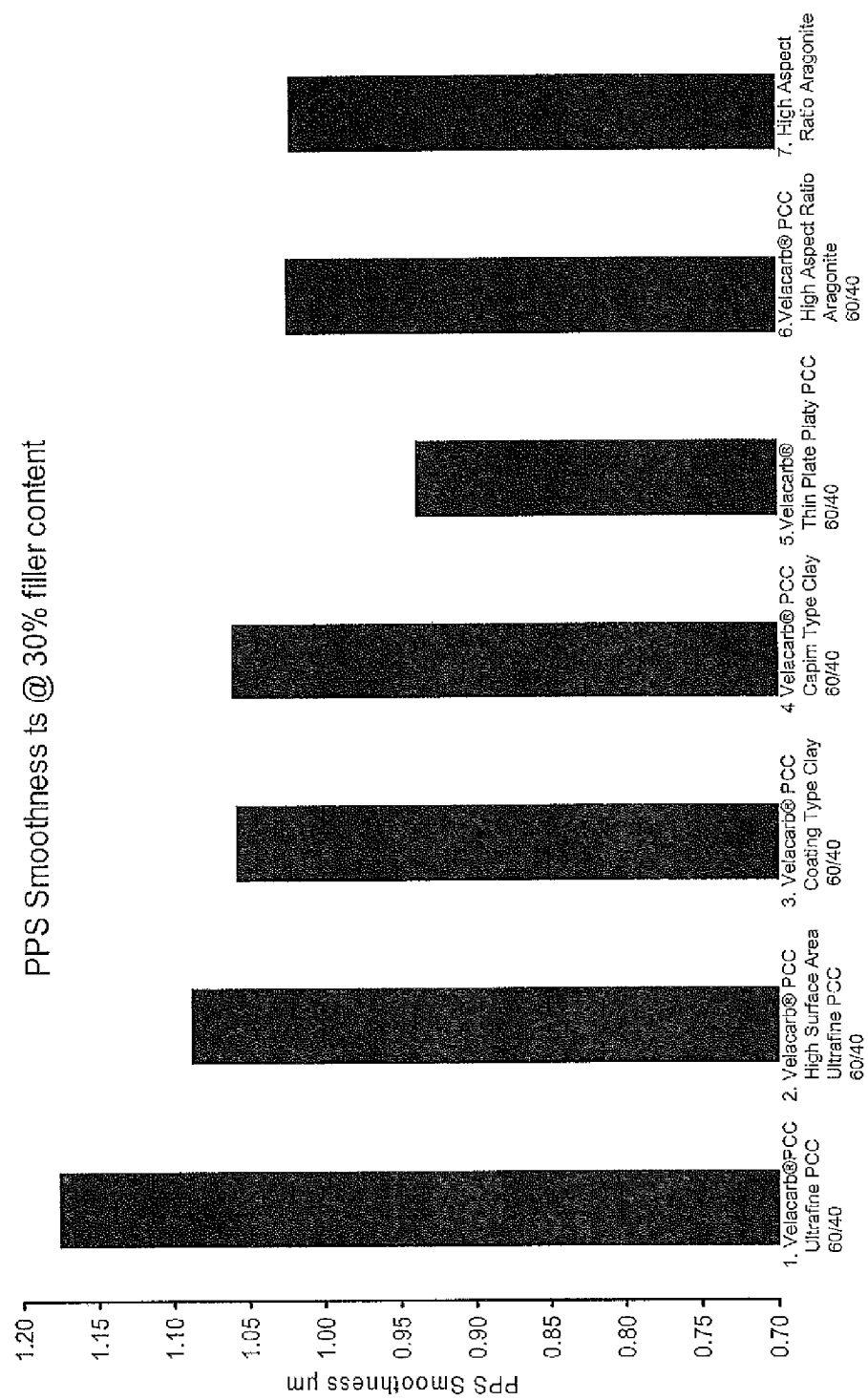
FIG. 11 is a chart showing the Parker Print Surface (PPS) smoothness of the paper surface of supercalendered paper having each of the blends of PCC fillers and clays as specified at 30 weight percent total filler content.
Figure 12:
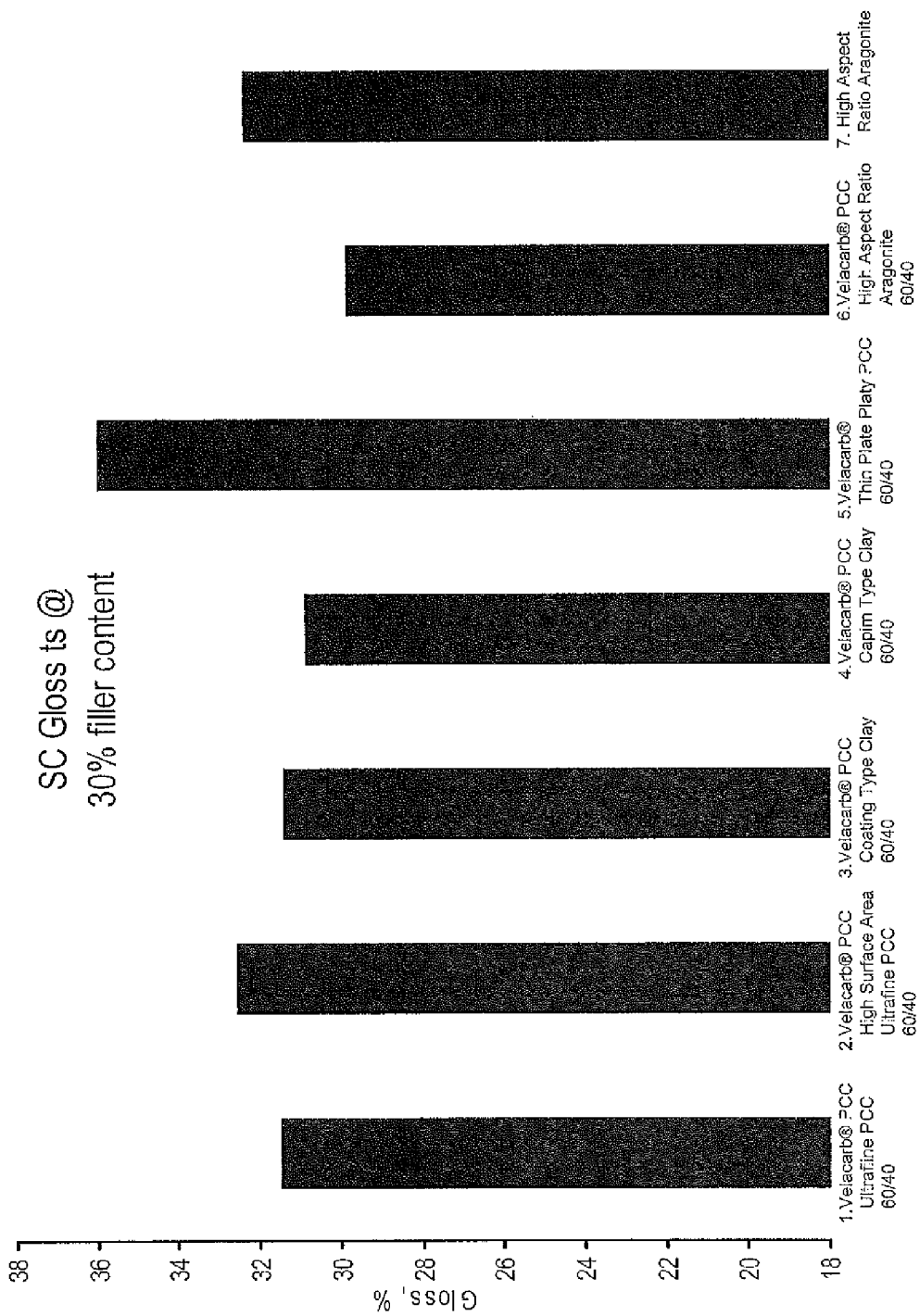
FIG. 12 is a chart showing the supercalendered (SC Gloss top side) or light reflectivity of supercalendered paper having each of the blends of PCC fillers and clays as specified at 30 weight percent total filler content.
Figure 13:
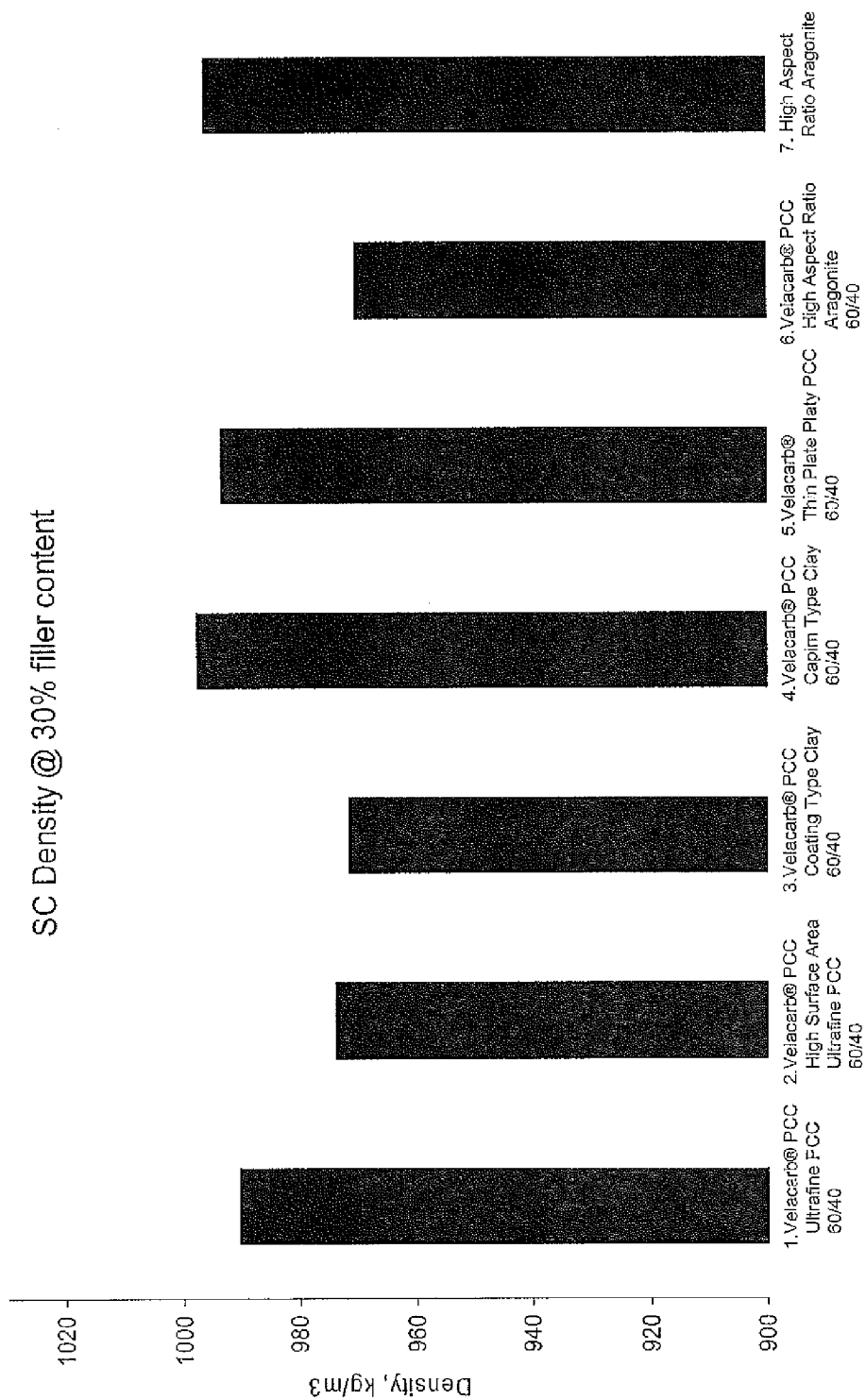
FIG. 13 is a chart showing the supercalendered density of supercalendered paper having each of the blends of PCC fillers and clays as specified at 30 weight percent total filler content.

When comparing the data from Tables 5-I to 5-VII, it can be seen that filler blend 1, a 60/40 blend of VELACARB® PCC and ULTRAFINE PCC and filler blends 3 and 4 (60/40 respectively of VELACARB® PCC and coating type clay, and VELACARB® PCC and capim type clay) all gave similar results for porosity, brightness and opacity as seen in FIGS. 8, 9 and 10.

From the data it is seen that the addition of small particle size PCCs such as fine PCCs to existing commercial PCC products used in SC paper applications significantly reduces porosity and absorptivity as measured by PDA, without a significant adverse effect on other paper properties.

Figure 3:
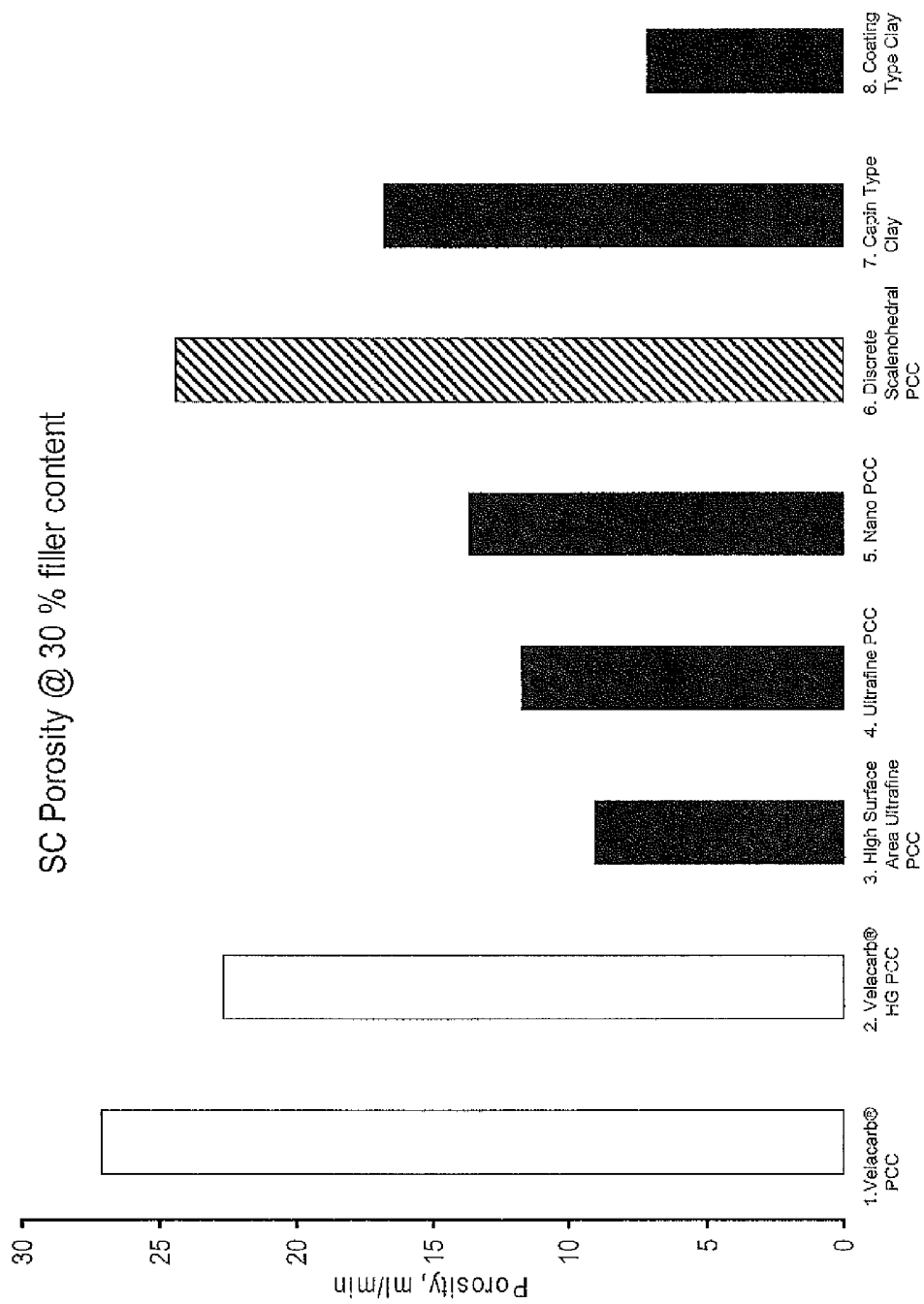
FIG. 3 is a chart showing the porosity of supercalendered paper having each of the PCC fillers and clays as specified at 30 weight percent total filler content.

As can be seen in FIG. 3 and FIG. 10, including a fine PCC with an existing commercial PCC product, VELACARB® PCC, lowered the porosity of supercalendered paper from 27 to 20.6 and 22.3. Both reduced porosity and increased PDA value are expected to translate to better commercial printability.

Table 6 below sets forth properties of three fillers or pigments which were made into the filler blends set forth in Table 7. The resulting filler blends were tested at twenty nine weight percent filler content for porosity and other properties at measured above in supercalendered paper in a papermaking machine as set forth in Table 8. Including a fine PCC such as High Surface Area ULTRAFINE PCC with an existing commercial PCC product, VELACARB® PCC, lowered the porosity of supercalendered paper from 21 to 18 and 15.

TABLE 6

Pigment Characterization

| Sample Number | Filler/Pigment Name | Specific Surface Area m²/g | PSD₂₀ | PSD₅₀ | PSD₉₀ |
|---|---|---|---|---|---|
| 9 | VELACARB® PCC | 11 | 0.7 | 1.4 | 2.4 |
| 10 | ULTRAFINE PCC High Surface Area | 48 | 0.5 | 0.8 | 1.4 |
| 11 | ULTRAFINE PCC High Surface Area | 46 | 0.7 | 1.1 | 2.0 |

TABLE 7

| FILLER BLEND SAMPLE NUMBER FILLER BLEND COMPONENTS: | Component Proportion [%] | Filler weight % |
|---|---|---|
| 8. VELACARB® | 100 | 29 |
| 9. VELACARB® and High Surface Area ULTRAFINE PCC | 75/25 | 29 |
| 10. VELACARB® PCC and High Surface Area ULTRAFINE PCC | 70/30 | 29 |

TABLE 8

| FILLER BLEND SAMPLE NUMBER FILLER BLEND COMPONENTS: | Basis Wt. g/m2 | Air Permeability (ml/min) | Brightness (R-457 c/2 avg) | Opacity (%) |
|---|---|---|---|---|
| 8. VELACARB® | 57.8 | 21 | 80.9 | 93.2 |
| 9. VELACARB® and High Surface Area ULTRAFINE PCC | 58.3 | 18 | 80 | 92.3 |
| 10. VELACARB® PCC and High Surface Area ULTRAFINE PCC | 56.5 | 15 | 77.7 | 90.5 |

Accordingly, it is understood that the above description of the present invention is susceptible to considerable modifications, changes and adaptations by those skilled in the art, and that such modifications, changes and adaptations are intended to be considered within the scope of the present invention, which is set forth by the appended claims.

We claim:

1. A pigment composition comprising:
   a) first precipitated calcium carbonate pigment comprising PCC particles; and
   b) a fine precipitated calcium carbonate having an average size range of 0.06 to 1.1 microns, a particle size distribution $D_{20}$ of about 0.2 microns or less, and a specific surface area of at least about 20 m²/g;
   wherein the weight ratio of the first precipitated calcium carbonate pigment to the fine precipitated calcium carbonate is about 60:40 to 75:25.

2. The pigment composition of claim 1 wherein the fine precipitated calcium carbonate has a specific surface area between about 20 m²/g to 50 m²/g.

3. The pigment composition of claim 1 wherein the fine precipitated calcium carbonate has a PCC particle size distribution $D_{90}$ of about 1.0 microns or less.

4. The pigment composition of claim 1 wherein the fine precipitated calcium carbonate has a PCC particle size distribution $D_{90}$ of about 1.5 microns or less.

5. The pigment composition of claim 1 wherein the fine precipitated calcium carbonate has a PCC particle size distribution $D_{90}$ of about 2.0 microns or less.

6. The pigment composition of claim 1 wherein the fine precipitated calcium carbonate has a PCC particle size distribution $D_{50}$ of about 0.4 microns or less.

7. The pigment composition of claim 1 wherein the fine precipitated calcium carbonate has a PCC particle size distribution $D_{50}$ of about 0.8 microns or less.

8. The pigment composition of claim 1 wherein the first precipitated calcium carbonate pigment PCC particles are non-platy PCC particles.

9. The pigment composition of claim 1 wherein the first precipitated calcium carbonate pigment PCC particles have a specific surface area of at least about 10 m²/g or greater.

10. The pigment composition of claim 1 wherein the first precipitated calcium carbonate pigment PCC particles have a PCC particle size distribution $D_{90}$ of about 3.0 microns or less.

11. A pigment composition comprising:
  a) first precipitated calcium carbonate pigment comprising PCC particles; and
  b) a fine precipitated calcium carbonate having an average size range of 0.06 to 1.1 microns, a particle size distribution $D_{20}$ of about 2.0 microns or less, and a specific surface area of at least about 20 $m^2/g$;
  wherein the weight ratio of the first precipitated calcium carbonate pigment to the fine precipitated calcium carbonate is about 60:40.

* * * * *